(12) United States Patent
Argyropoulos

(10) Patent No.: US 9,340,426 B2
(45) Date of Patent: May 17, 2016

(54) HIGH VALUE LIGNIN DERIVATIVES, POLYMERS, AND COPOLYMERS AND USE THEREOF IN THERMOPLASTIC, THERMOSET, COMPOSITE, AND CARBON FIBER APPLICATIONS

(71) Applicant: NORTH CAROLINA STATE UNIVERSITY, Raleigh, NC (US)

(72) Inventor: Dimitris S. Argyropoulos, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 109 days.

(21) Appl. No.: 13/771,653

(22) Filed: Feb. 20, 2013

(65) Prior Publication Data

US 2013/0255216 A1     Oct. 3, 2013

Related U.S. Application Data

(60) Provisional application No. 61/601,181, filed on Feb. 21, 2012.

(51) Int. Cl.
| | | |
|---|---|---|
| *C01B 31/02* | (2006.01) | |
| *C08L 97/00* | (2006.01) | |
| *D01F 9/17* | (2006.01) | |
| *C07G 1/00* | (2011.01) | |
| *D02G 3/02* | (2006.01) | |
| *C08H 7/00* | (2011.01) | |

(52) U.S. Cl.
CPC . *C01B 31/02* (2013.01); *C07G 1/00* (2013.01); *C08H 6/00* (2013.01); *C08L 97/005* (2013.01); *D01F 9/17* (2013.01); *D02G 3/02* (2013.01)

(58) Field of Classification Search
CPC ........ C01B 31/02; C08L 97/005; C08H 6/00; D01F 9/17; C07G 1/00
See application file for complete search history.

(56) References Cited

U.S. PATENT DOCUMENTS

| | | | | |
|---|---|---|---|---|
| 3,546,199 | A * | 12/1970 | Melvin et al. | 530/500 |
| 3,795,665 | A * | 3/1974 | Ludwig | 530/500 |
| 3,912,706 | A * | 10/1975 | Rachor et al. | 527/403 |
| 3,984,363 | A * | 10/1976 | D'Alelio | 526/270 |
| 4,184,845 | A * | 1/1980 | Lin | 8/636 |
| 4,250,088 | A * | 2/1981 | Yang | 530/505 |
| 4,769,434 | A * | 9/1988 | Van der Klashorst et al. | 527/403 |
| 4,790,382 | A * | 12/1988 | Morrow et al. | 166/270.1 |
| 5,094,295 | A * | 3/1992 | Morrow | 166/270.1 |
| 5,102,991 | A * | 4/1992 | Glasser et al. | 530/500 |
| 5,102,992 | A * | 4/1992 | Glasser et al. | 530/502 |
| 5,344,921 | A * | 9/1994 | Sudo et al. | 530/502 |
| 6,025,452 | A * | 2/2000 | Kurple | 527/301 |
| 6,054,562 | A * | 4/2000 | Kurple | 530/504 |
| 6,172,204 | B1 * | 1/2001 | Sarkanen et al. | 530/500 |
| 6,593,460 | B1 * | 7/2003 | Huttermann et al. | 530/505 |
| 2010/0204368 | A1 * | 8/2010 | Benko et al. | 524/73 |
| 2011/0274612 | A1 * | 11/2011 | Wohlmann et al. | 423/447.2 |
| 2013/0338347 | A1 * | 12/2013 | Cao et al. | 530/500 |

FOREIGN PATENT DOCUMENTS

WO     WO 2010081775 A1 *  7/2010

OTHER PUBLICATIONS

Sun et al., Polymer Degradation and Stability 68, 2000, 111-119.*

* cited by examiner

*Primary Examiner* — Liam J Heincer
(74) *Attorney, Agent, or Firm* — Womble Carlyle Sandridge & Rice, LLP

(57) ABSTRACT

The present disclosure relates to reactive modified lignin, methods of preparing such modified lignin, and materials, such as polymer systems, incorporating the modified lignin. More specifically, the lignin can be modified by selectively masking reactive functional groups such that the material has a modulated reactivity and is thus better suited for incorporation into and/or formation of further materials, such as carbon fibers.

35 Claims, 12 Drawing Sheets

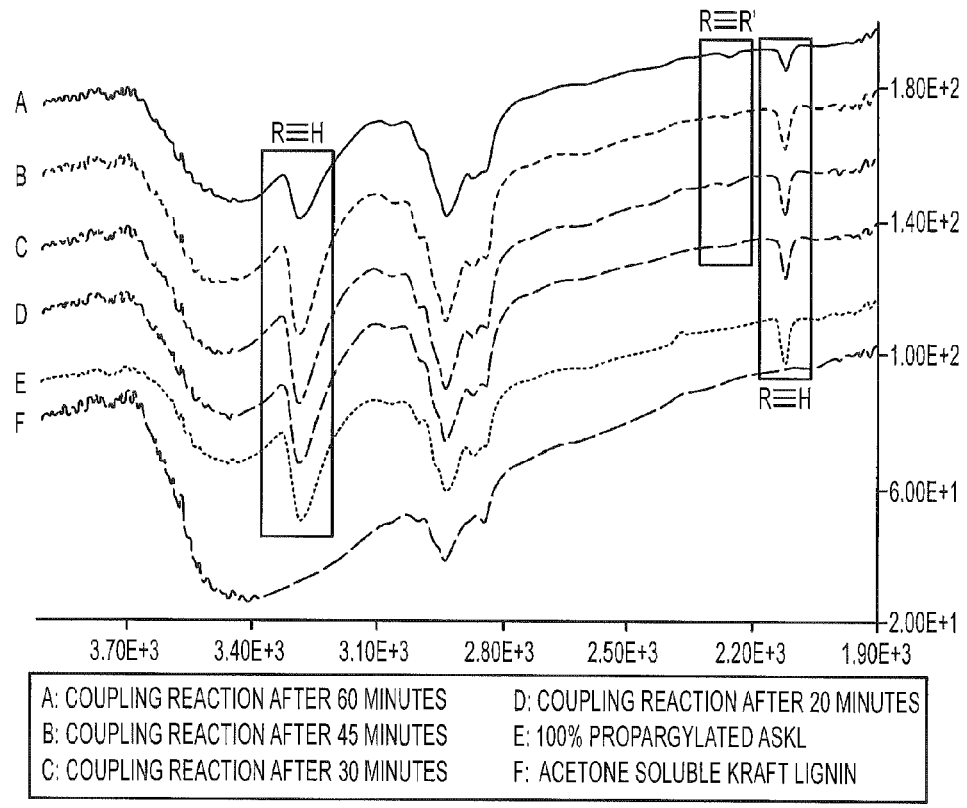
FIG. 12
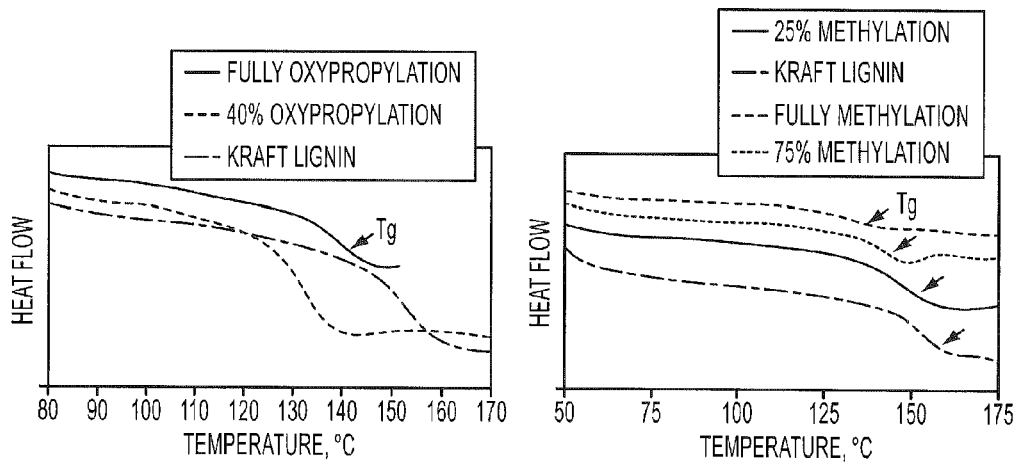
FIG. 13A
FIG. 13B

HIGH VALUE LIGNIN DERIVATIVES, POLYMERS, AND COPOLYMERS AND USE THEREOF IN THERMOPLASTIC, THERMOSET, COMPOSITE, AND CARBON FIBER APPLICATIONS

CROSS-REFERENCE TO RELATED APPLICATIONS

The present application claims priority to U.S. Provisional Patent Application No. 61/601,181, filed Feb. 21, 2012, the disclosure of which is incorporated herein by reference in its entirety.

FIELD OF THE DISCLOSURE

Disclosed herein are methods of forming modified lignins of controlled thermal stability and reactivity and methods of incorporating such modified lignins into polymer systems, carbon fiber, and other applications, as well as the formed, reactive modified lignins and the polymer systems and carbon fiber incorporating the modified lignins.

BACKGROUND

Lignin is a highly abundant biopolymeric material (second only to cellulose) and can be derived from wood via processes that have been used for many years. Lignin is an amorphous, highly branched polyphenolic macromolecule with a complex structure, and the material typically forms about ⅓ of the dry mass of woody materials. The general structure of native lignin is shown in FIG. 1; however, lignin structure is known to be significantly altered when lignocellulosic material (e.g., wood or other plant materials) are treated under conditions intended to separate the lignin from the cellulose.

Lignin provides structure to woody materials and is the component responsible for the strength of wood against mechanical stress. The physical and chemical properties of lignin can vary depending upon the wood species, the botanical origin, and the region from which the wood is harvested, and the process by which the lignin is isolated. Lignin typically is obtained from pulping processes such as used in the paper and biorefinery industries where the lignin is separated from cellulosic fibers. Large quantities of modified lignin are made available yearly from pulping processes as well as bio-ethanol digestion and saccharification processes. For example, the global production of isolated lignin from sulphite processes is about 1 million tons/year, and Kraft processes provide around 100,000 tons/year of lignin. The "technical lignin" arising from such methods has undergone severe hydrolytic degradation imparting a highly reactive structure and a relatively low molecular weight. This can render technical lignins unsuitable for many value added applications despite its aromatic and somewhat polymeric nature.

Previously, the majority of produced technical lignin (~90%) has been used as a combustion fuel to provide energy for heat or power production. Lignin also has been used as an additive in various low volume and niche applications, such as being used as a dispersant, in concrete admixtures, as a binder in mining operations (e.g., copper, carbon black, and coal), and as an adhesive. Efforts to use lignin as a source of valuable carbon fiber have also been made with limited success. The common feature for such previous commercial uses of lignin is that, in all cases, the lignin only serves as an additive to produce relatively low added value products.

Most efforts to utilize lignin previously have been limited by various factors that impart in lignin characteristics that define it as an unreliable precursor to polymer production. This is because lignin (and more specifically technical lignin) offers relatively unpredictable polymerization characteristics, depending upon its source, the pulping (or other process) from which the lignin arises, and the degree of delignification to which the plant materials were subjected. More specifically, the highly functional character of lignin (i.e., rich in phenolic and aliphatic OH groups, as well as reactive benzylic carbons) induces a variety of potential polymerization sites and heat instability in such materials. Both factors promote gelation processes under polymerization conditions or when the temperature increases close to and/or above the glass transition temperature (Tg). Heating of lignin at an elevated temperature converts it to a condensed from and makes it rigid and less reactive. The irreversible formation of such gels precludes lignin from becoming and being considered as an integral part of modern synthetic polymer and composite production lines. In addition, the relatively low molecular weight (a few thousands) for lignin derived from commercial pulping and biorefinery operations makes lignin unsuitable for higher end applications, such, for example, high performance, heat stable engineering thermoplastic applications.

Chemically, lignin has a variety of functional groups, namely hydroxyl, methoxyl, carbonyl and carboxyl groups. Phenolic hydroxyl groups in the aromatic rings are the most reactive functional groups in the lignin and can significantly affect the chemical reactivity of the material. Higher end uses of lignin have not previously been achieved because of its structural complexity, augmented reactivity, and thermal instability. To improve upon this limitation, different types of modifications have been proposed with objectives to increase its chemical reactivity, reduce the brittleness of lignin-derived polymers, increase its solubility in organic solvents, and improve the ease of processing the lignin. For example lignin modification with propylene oxide for preparation of engineering plastic and polyurethane foam has been proposed. This type of modification results in the formation of lignin polyol derivatives, which in turn improves the solubility and uniformity of the lignin. During the modification, the majority of phenolic hydroxyl groups are converted to aliphatic hydroxyl units. Thus, more reactive hydroxyl groups become readily available. Previous methods have consisted of mixing the solid lignin into pure propylene oxide in the presence of a base (usually KOH) at a temperature of 150-200° C. for 1 to 2 hours.

In general, lignin is a green biomaterial which has a great market potential in renewable energy and biopolymeric materials. Despite the previous attempts in the field, new methods and materials utilizing lignin are desirable.

BRIEF SUMMARY OF THE DISCLOSURE

The present disclosure provides reactive modified materials that are stabilized and rendered better suited for industrial applications. Specifically, the disclosure provides methods for selectively protecting and/or masking reactive functional groups on lignin such that the reactivity of the lignin is controlled and modulated as desired. Thus, in certain embodiments, the disclosure can be characterized as providing a reactive modified lignin. Specifically, such reactive modified lignin can comprise a lignin having a content (e.g., about 5% or greater) of its initial reactive functional groups thereon protected with a masking moiety. Preferably, the masking moiety can be less reactive than the functional group that is masked.

The reactive modified lignin according to the present disclosure can be characterized in that it exhibits characteristics associated with thermal stability and polymerization stability such that heating of the modified lignin at a temperature of about 20° C. above its glass transition temperature (Tg) increases that molecular weight of the modified lignin by no more than about 10%. Further, the reactive modified lignin can be characterized as exhibiting a thermal stability such that weight loss of the modified lignin is less than 5% when heating to a temperature of greater than 225° C. Moreover, the modified lignin can exhibit a glass transition temperature (Tg) that varies with the percentage of reactive functional groups that are masked with the masking moiety. The thermal properties and molecular weight distributions of copolymers produced from such protected lignins can vary in accordance with the degree of protection, and this provides means for modulating the properties of an otherwise intractable polymer.

The types of reactive functional groups that are masked can vary. The reactive functional groups that are masked can be selected from the group consisting of hydroxyl, methoxyl, carbonyl, and carboxyl, and combinations thereof. Specifically, the reactive functional group can be present on a phenol group of the lignin, more specifically it can be a phenolic OH group.

The masking moiety likewise can be selected from a variety of materials. For example, the masking moiety can be selected from the group consisting of optionally substituted alkyl, optionally substituted alkenyl, optionally substituted alkynyl, and combinations thereof.

In further embodiments, the disclosure can provide lignin polymers prepared from the reactive modified lignins, as described herein. Such lignin polymers may have a molecular weight of, for example, about 5,000 Da or greater.

Still further, the disclosure can provide various polymer systems that comprise a reactive modified lignin as disclosed herein. For example, the polymer system can be such that the reactive modified lignin is covalently bonded within a three-dimensional network polymer. Moreover, the polymer system can be a copolymer of the reactive modified lignin and a further monomer. Yet further, the polymer system can be a linear polymer. The reactive modified lignin or a polymer system formed therewith can be in the form of a solution or melt blend.

In additional embodiments, the present disclosure can provide carbon fiber. In particular, the carbon fiber can be formed by subjecting a spun polymer comprising a reactive modified lignin as described herein to carbonization conditions. As such, the carbon fiber can be defined as comprising a carbon backbone that is substantially identical to the carbon backbone of the polymer system from which the fiber was spun.

Further to the above, the disclosure can provide methods of preparing polymer systems. For example, such methods can comprise reacting a reactive modified lignin as disclosed herein with a second material under conditions such that the modified lignin covalently bonds with the second material. Specifically, the second material can be a three-dimensional network polymer. Further, the second material can be a monomer. The second material can be selected from the group consisting of optionally substituted alkyl, optionally substituted alkenyl, optionally substituted alkynyl, and combinations thereof. Methods further can comprise controllably modulating thermal reactivity of a polymer system as described herein by varying the amount of the second material utilized in the reaction relative to the lignin. The methods also can comprise carbonizing the polymer system. Preferably, the methods further comprise spinning the polymer system into one or more fibers prior to the carbonizing step.

The disclosure also provides methods for preparing the initial, reactive modified lignin. An exemplary method can comprise reacting a starting lignin with a masking moiety under conditions such that a content (e.g., about 5% or greater) of the reactive functional groups on the starting lignin react with the masking moiety and become masked by the moiety. Preferably, the masking moiety can be less reactive than the functional group that is being masked. In certain embodiments, the masking moiety can be of controlled and enhanced reactivity and thus be adapted for formation of heretofore unknown lignin architectures. Exemplary embodiments include carbon fiber precursor polyethers. Methods further can comprise polymerizing the reactive modified lignin. The polymerizing can comprise copolymerizing the reactive modified lignin with a comonomer. The reactive modified lignin also can be formed into a solution or melt blend.

The present disclosure also can provide methods of forming a carbon fiber. In particular embodiments, such method can comprise: polymerizing a reactive modified lignin comprising a lignin having about 5% or greater of the reactive functional groups thereon masked with a masking moiety that is less reactive than the functional group; spinning the polymerized reactive modified lignin into one or more fibers; and carbonizing the one or more fibers. The polymerizing particularly can comprise copolymerizing the reactive modified lignin with a comonomer.

The source of the lignin used according to the present disclosure can vary. In certain exemplary embodiments discussed herein, technical Kraft lignin from softwoods was utilized, but the disclosure is not limited to only such sources. Rather, the methods and products disclosed herein can encompass the use of a large variety of lignin sources, including hardwoods and annual plants. The present disclosure beneficially can allow for the use of lignin in applications that significantly exceed the traditional sources of the pulp and paper industry and into those produced from modern biorefinery operations. These can include organosolv, steam explosion, ethanol and other alcohol pulping, and acidic pulping processes.

Further, the disclosure can be characterized in that technical lignins can be structurally modified so as to form lignins of modulated reactivity by the selective masking procedures discussed herein. The thus formed, masked lignins exhibit modulated reactivity characteristics making them highly useful components for network and linear polymers and composite materials. As such, the present disclosure provides a significant advancement in lignin chemistry that provides significant flexibility in choosing lignin source and in tuning the eventual polymer properties to desired and pre-defined characteristics. This is all achieved while simultaneously preventing the lignin from becoming a gel during polymerization, which is a phenomenon that has previously significantly limited the usefulness of technical lignins in preparing high value polymers.

The modulated reactivity arising from the specific derivatization chemistries can provide reduced reactivity or enhanced reactivity, as desired, for use in specific applications. For example, reduced thermal reactivity can be useful for stabilizing lignin polymer and copolymer melts. In further embodiments, the incorporation of propargyl groups within substantially fully derivatized lignins can be useful for providing modulated, controlled, and enhanced modes for increasing the reactivity of lignins in a regulated and uniform manner. This can be useful during, for example, a carbonization step in a carbon fiber production line.

In further embodiments, the disclosure can be characterized in relation to the ability to prepare lignin derivatives of increased thermal stability. In particular, fractionation methods can allow for identifying and isolating lignins of desired characteristics (e.g., molecular weight, uniform molecular weight distribution, and functionality). In one embodiment, the disclosure thus provides a method that comprises the following steps: at least partially dissolving a lignin in a suitable solvent; separating a soluble lignin fraction from an insoluble lignin fraction; and modifying and optionally further purifying and fractionating the lignin from the soluble fraction by covalently incorporating a masking moiety into the structure thereof.

BRIEF DESCRIPTION OF THE DRAWINGS

Figure 1:
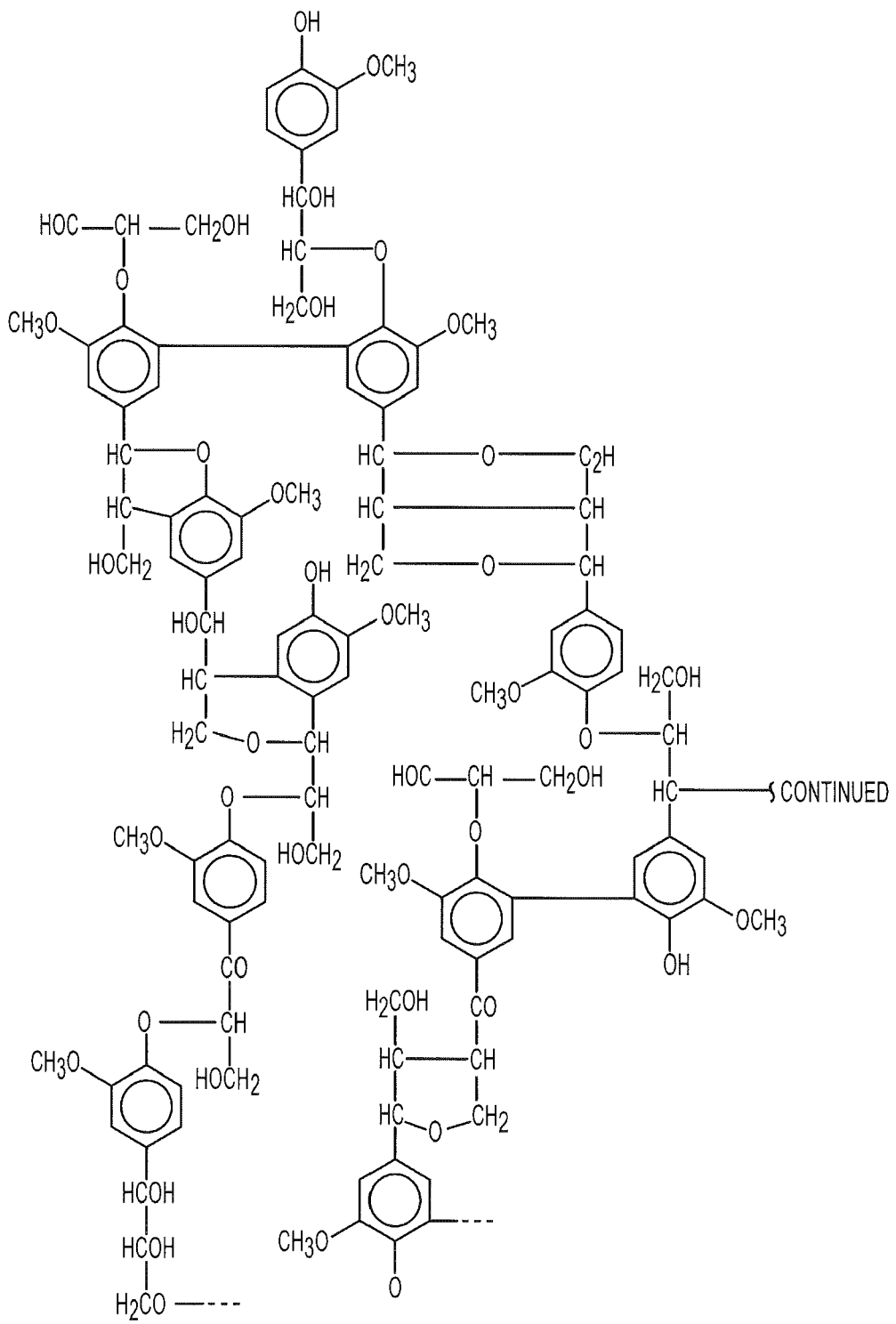
Figure 1:
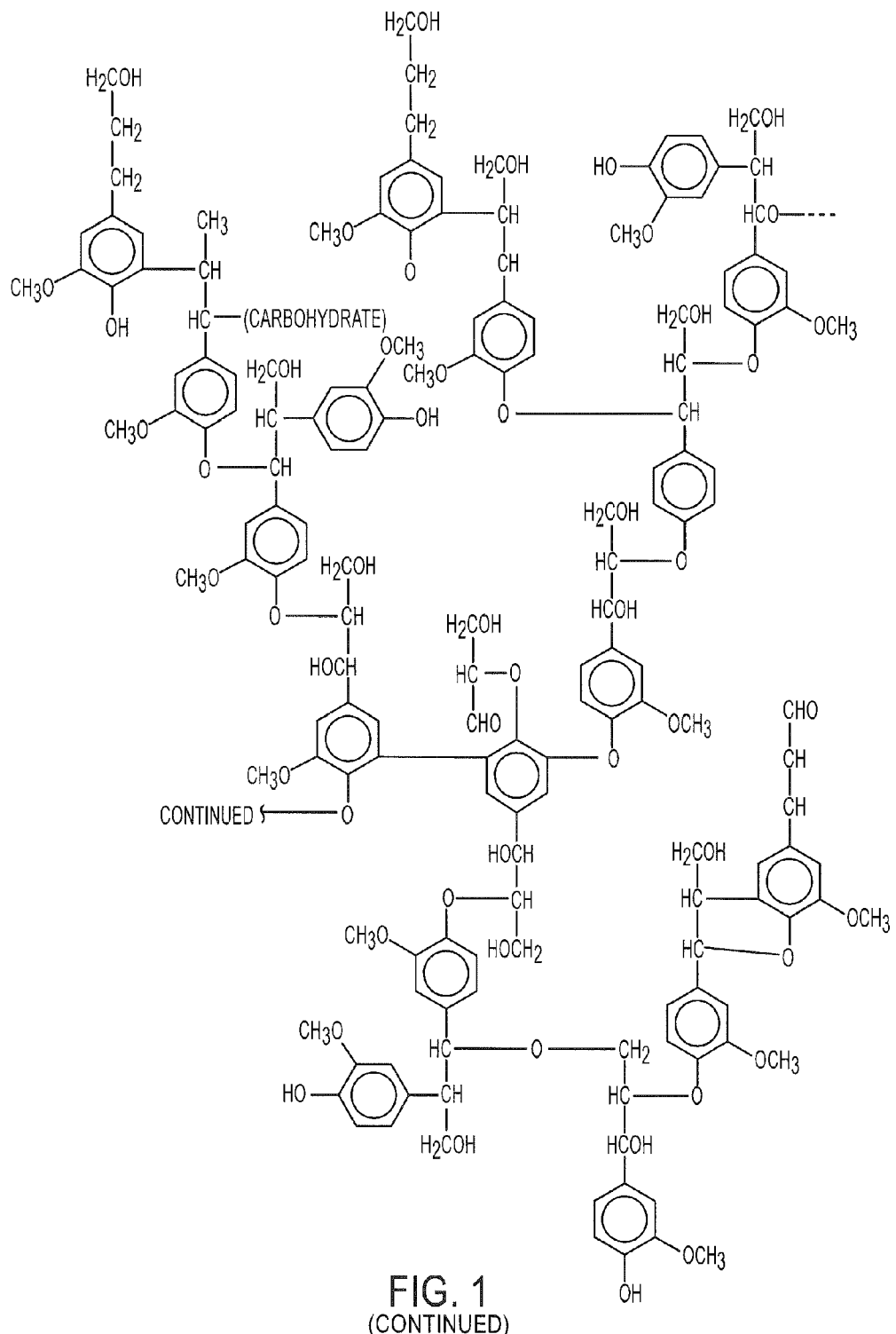
Figure 2A:
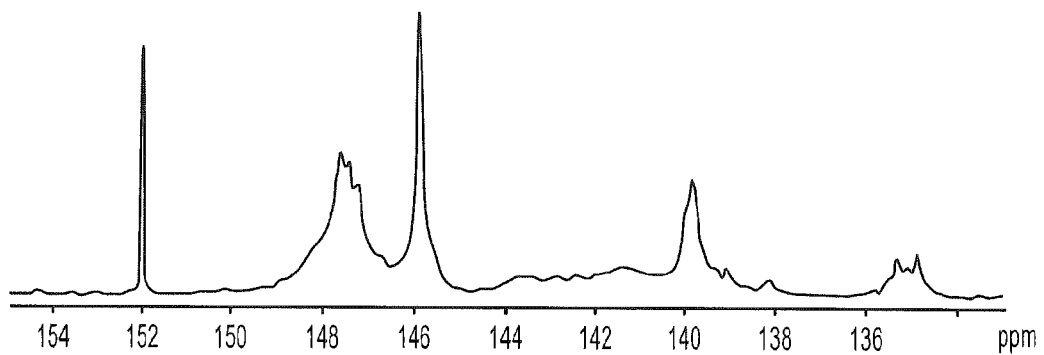
Figure 2B:
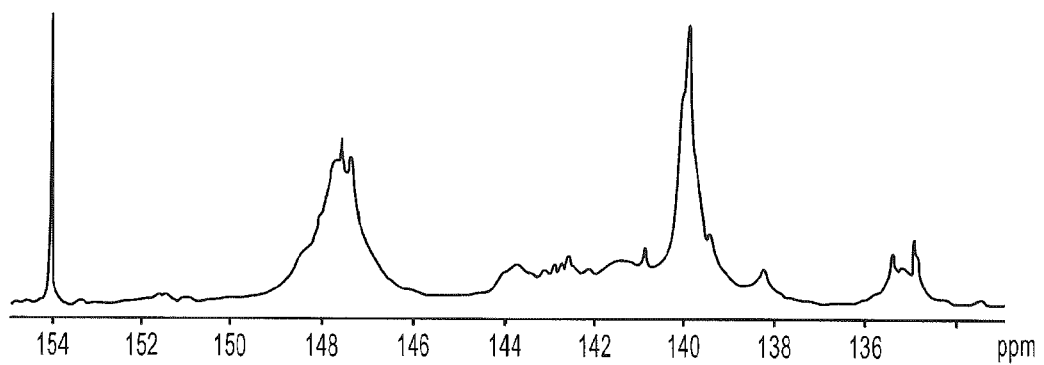
Figure 3:
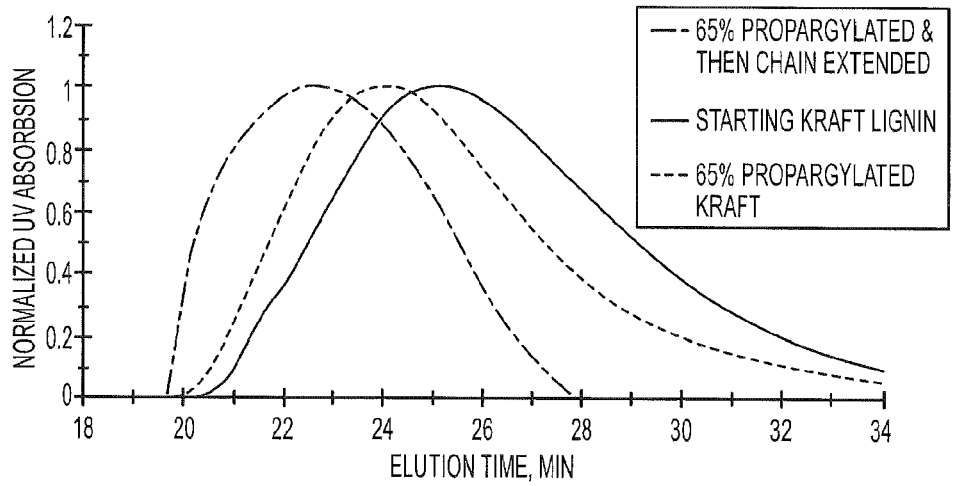
Figure 4:
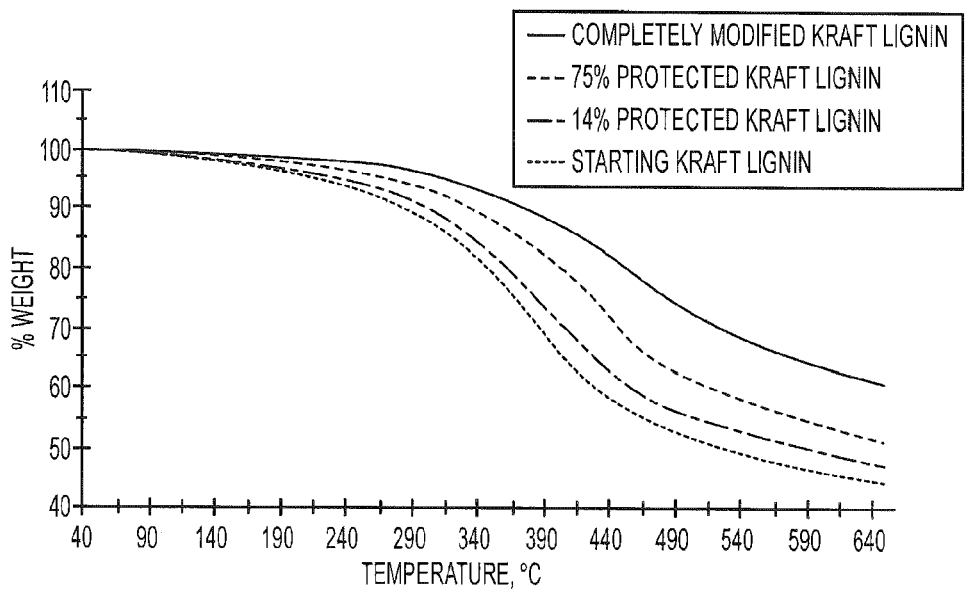
Figure 5:
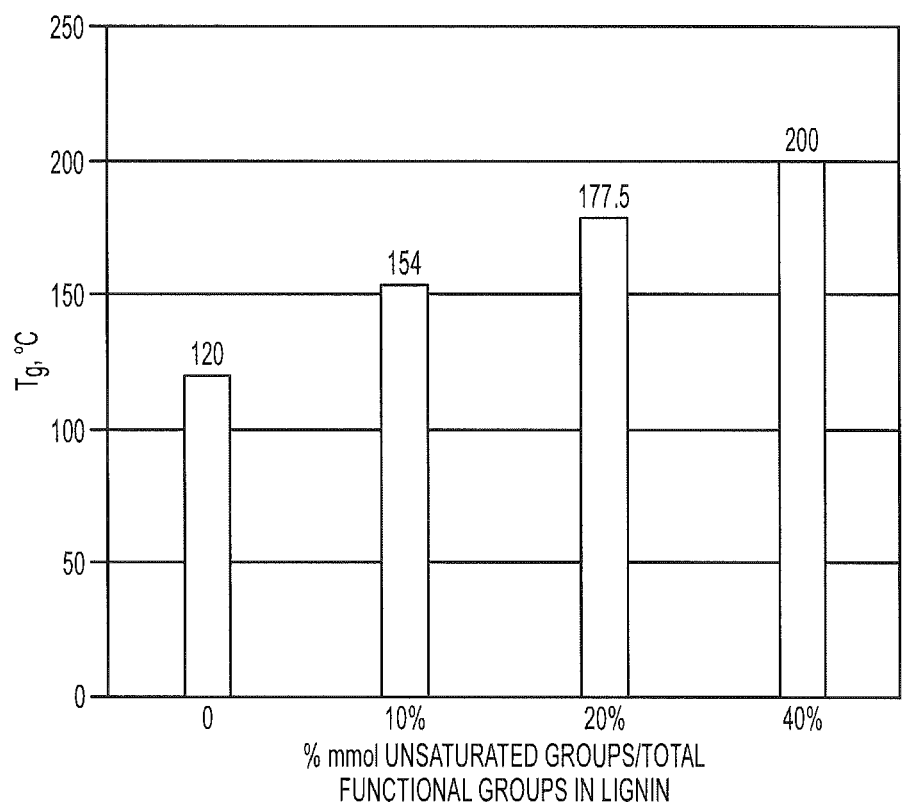
Figure 6:
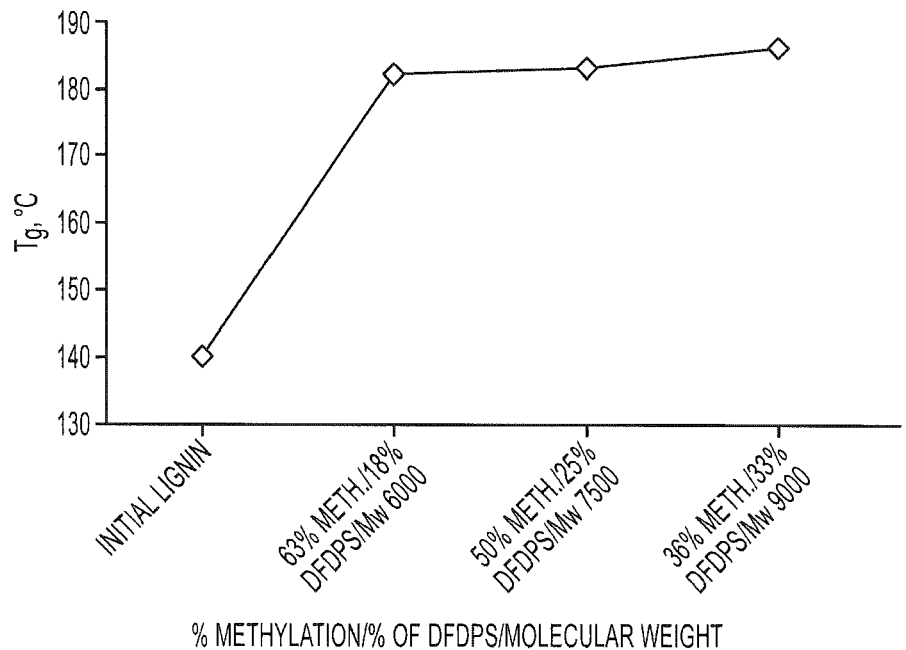
Figure 7:
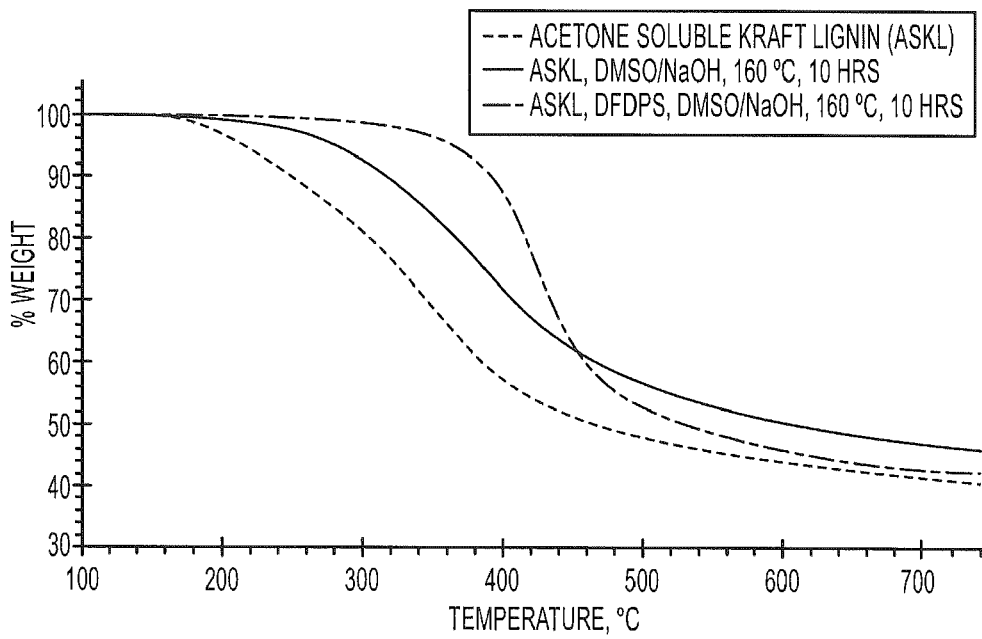
Figure 8:
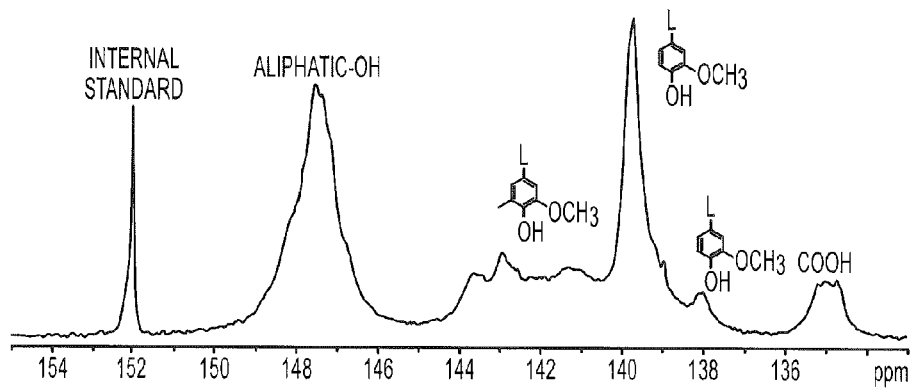
Figure 9:
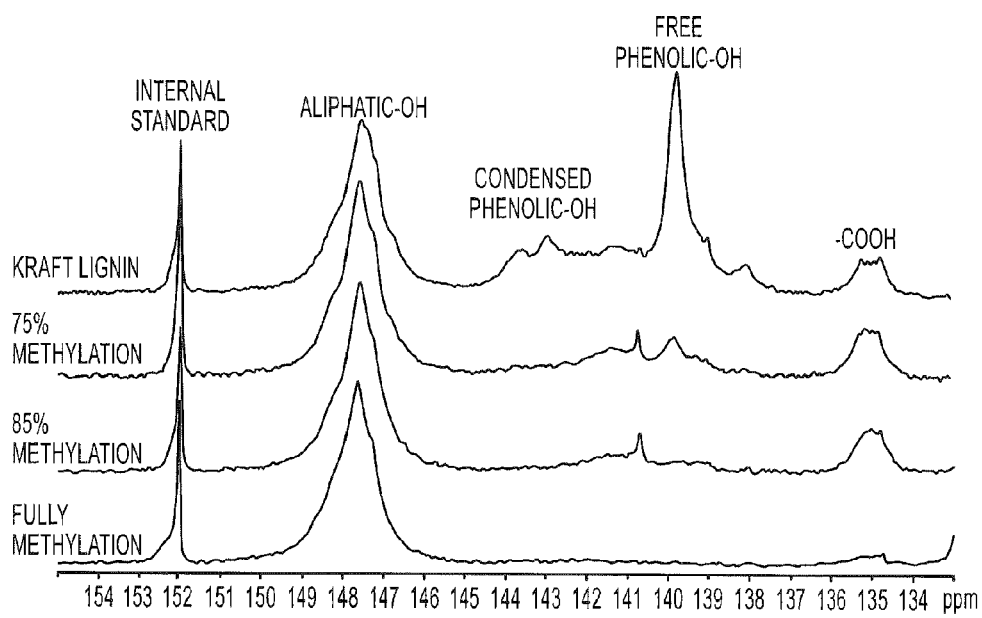
Figure 10:
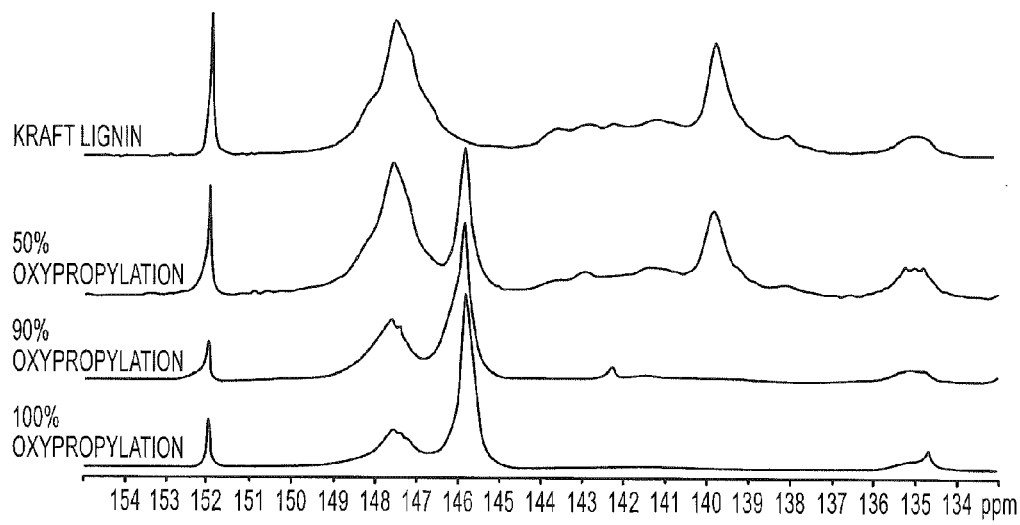
Figure 11:
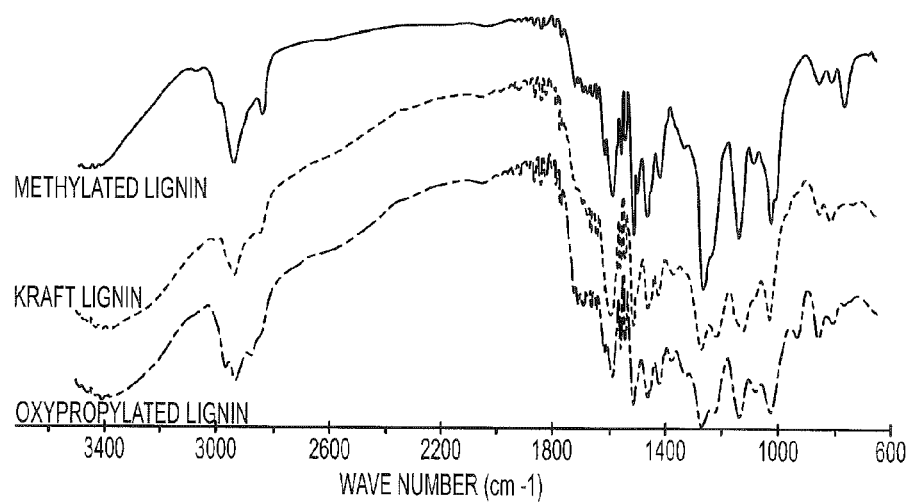

Having thus described the disclosure in general terms, reference will now be made to the accompanying drawings wherein:

FIG. 1 is a chemical structure representative of a typical lignin material;

FIG. 2 is the quantitative $^{31}$P NMR spectra of partially oxypropylated lignin (a) and a starting, unprotected lignin (b);

FIG. 3 is a gel permeation chromatogram for a starting Kraft lignin, a 65% propargylated derivative of the same lignin, and a copper mediated chain extended analog of the propargylated derivative, wherein the time to maximum elution is indicative of molecular weight;

FIG. 4 is a chart showing thermogravimetric weight loss for a starting Kraft lignin, two lignin derivatives propargylated at different levels, and a copper mediated chain extended, fully propargylated lignin;

FIG. 5 is a chart showing Differential Scanning calorimetric (DSC) data indicating that the glass transition temperatures of lignin derivatives, propargylated to various degrees, increases monotonically;

FIG. 6 is a chart illustrating variations in the glass transition temperature of various Kraft lignin/DFDPS copolymers as a function of methylation and composition;

FIG. 7 is a chart showing thermogravimetric analytical data for a sample of acetone soluble Kraft lignin (ASKL), an ASKL sample that was modified via treatment with NaOH in DMSO at 160° C. for 10 hours, and a sample of the treated ASKL copolymerized with difluorodiphenyl sulfone (DFDPS), the chart illustrating the improved thermal stability of the modified lignin and the copolymerized lignin FIG. 8 is a quantitative $^{31}$P NMR spectrum of a Kraft lignin showing the content of phenolic OH and aliphatic OH present in the material;

FIG. 9 is a quantitative $^{31}$P NMR spectrum of unmodified Kraft lignin compared to Kraft lignin with varying degrees of methylation with dimethyl sulfate (DMS);

FIG. 10 is a quantitative $^{31}$P NMR spectrum of unmodified Kraft lignin compared to Kraft lignin with varying degrees of oxypropylation;

FIG. 11 is an FTIR spectra of an unmodified Kraft lignin, a fully methylated lignin, and a fully oxypropylated lignin;

FIG. 12 is a series of infrared spectral data for various coupling reactions as a function of reaction time in comparison to 100% propargylated ASKL and ASKL alone;

FIG. 13 is a chart showing DSC curves for methylated lignin (B) and oxypropylated lignin (A)

Figure 14:
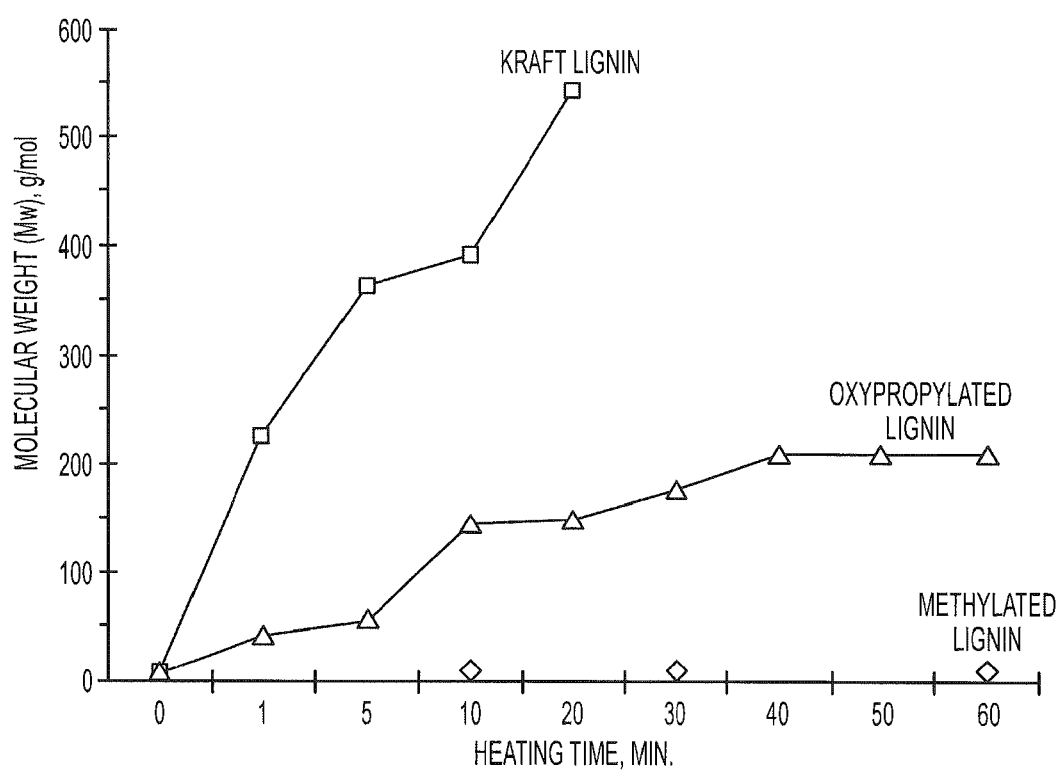
Figure 15:
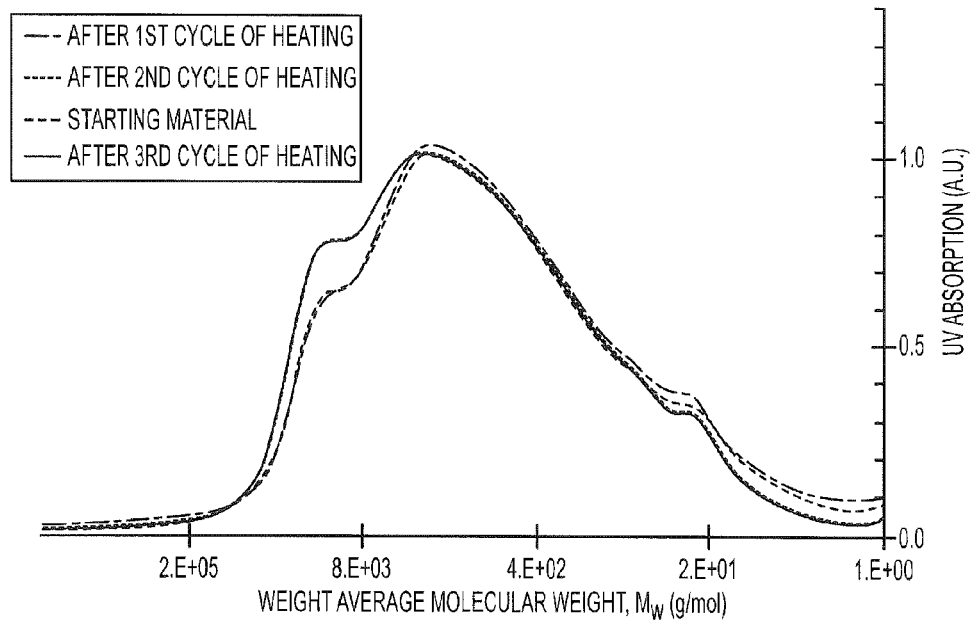
Figure 16:
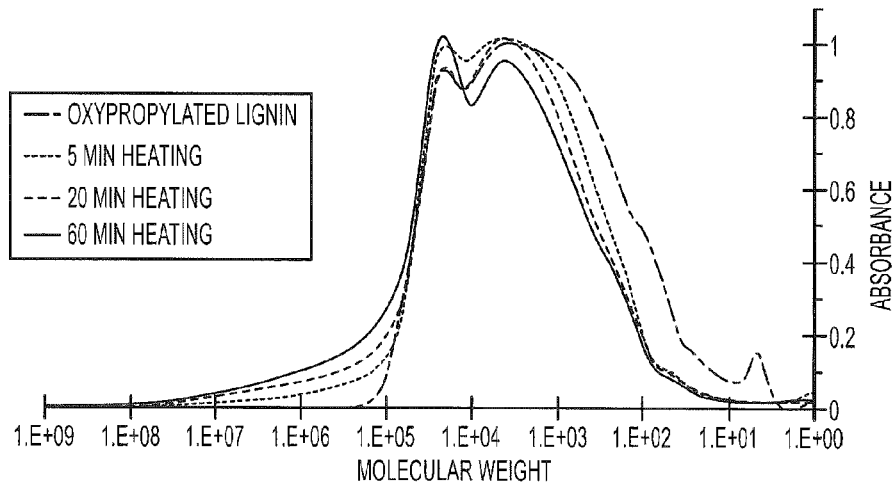
Figure 17:
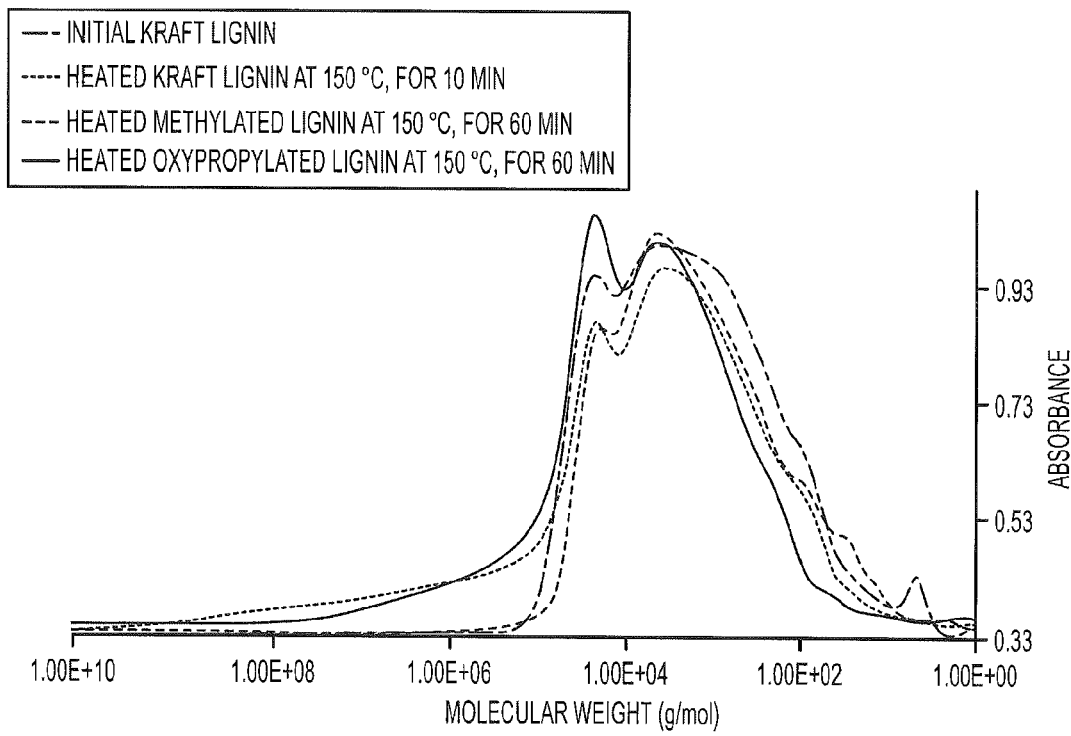
Figure 18:
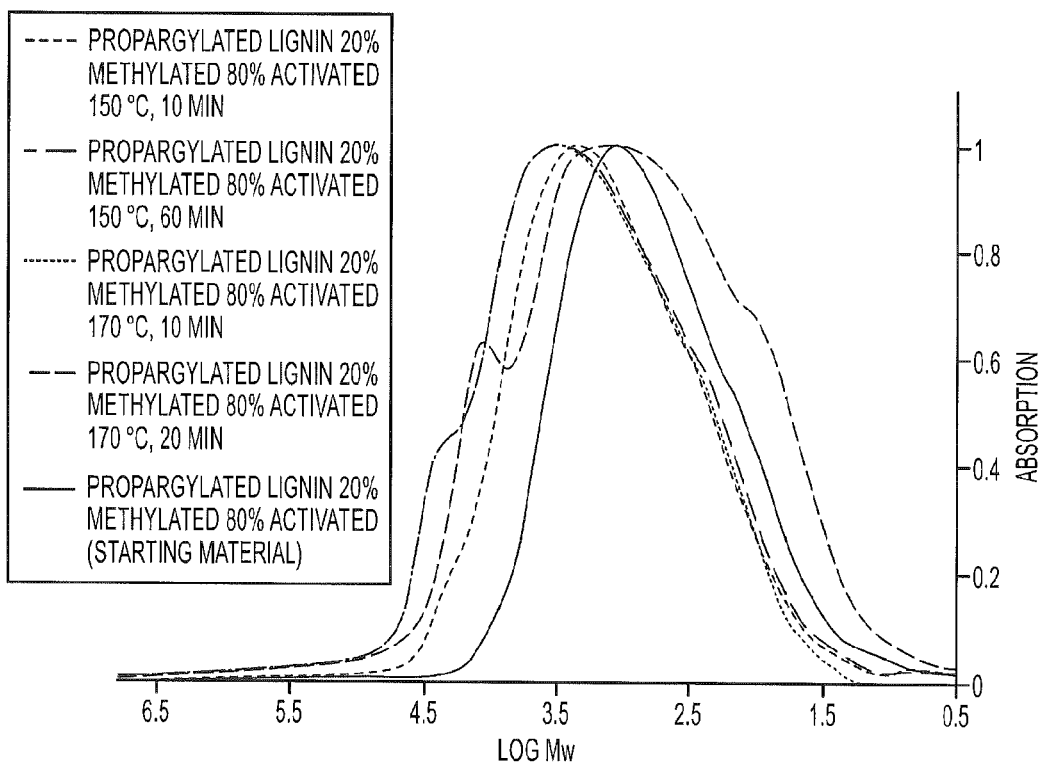

FIG. 14 is a chart illustrating changes in Kraft lignin, fully methylated lignin, and fully oxypropylated lignin after heating at temperatures above Tg;

FIG. 15 is a chart showing the effect of heating on molecular weight distribution of fully methylated Kraft lignin before and after heating and cooling cycles with a maximum heating temperature of about 150° C. being achieved in heating times of about one hour to about three hours;

FIG. 16 is a chart showing the effect of heating on molecular weight distribution of fully oxypropylated Kraft lignin before and after heating at 150° C.;

FIG. 17 is a chart showing the comparative effect of heating at 150° C. on the molecular weight distribution of sample of Kraft lignin, a sample of fully methylated lignin, and a sample of fully oxypropylated lignin; and FIG. 18 is a chart showing size exclusion chromatograms for a series of methylated and partially propargylated ASKL fractions being heated at different conditions.

DETAILED DESCRIPTION OF THE DISCLOSURE

The present disclosure beneficially overcomes limitations in the usefulness of lignins, particular technical lignins, through the application of chemistries that modify the lignin and provide it in a new form that provides increased usefulness. The modified lignins can be incorporated into polymer systems in a manner not previously recognized.

In one embodiment, the disclosure provides means for modifying the reactive properties of lignin by at least partially masking reactive functional groups (e.g., phenolic OH groups) on the material. The resulting material is a protected lignin that exhibits stable and consistent properties, and previous, limiting characteristics of lignin (e.g., rapid, irreversible gelation) are eliminated. The protected lignin can then be utilized as an integral component in high end uses, such as linear, long-chain, high performance and heat stable polymers, copolymers, and blends. Such polymer systems are particularly characterized in that the lignin is incorporated into the polymer by covalent bonding rather than simply functioning as an additive to the system. Thus, the disclosure provides for reactive modified lignin (i.e., lignin that has been chemically altered such that the reactivity of the lignin is modified and such that the reactivity is controllably modulated). The reactive modified lignin provides predictable and uniform properties and may be produced from a variety of sources, plant feedstocks, and processing conditions.

Chemical processes leading to the formation of technical lignins (such as pulping methods that separate the lignin from cellulose) rely upon scission of alkyl-aryl ether bonds. As a result, technical lignins are rich in phenolic hydroxyl (OH) groups. Such phenolic OH groups can be a primary functional group on technical lignin in that the phenolic OH groups can account for the majority of covalent bonding by the material. As such, the present disclosure may particularly describe processes and materials in relation to modification of the phenolic OH functional groups. Such discussion should not be viewed as limiting the scope of the disclosure, which can relate to masking of functional groups generally on technical lignin, including methoxyl, carbonyl, and carboxyl groups, as well as OH groups other than phenolic OH, such as aliphatic OH groups.

Reactive lignin functional groups can be modified through reaction with a variety of moieties. For example, methyl chloride and ethyl chloride can be used to mask a reactive functional group with an alkyl moiety. Methylation is particularly described in the Experimental section below. Propylene oxide in alkaline media likewise can be used to form an oxypropylated lignin with a reactive OH group. Preferably, the oxypropyl OH is less reactive than the functional phenolic OH group originally present. An exemplary reaction mechanism for reacting a phenolic OH on lignin with propylene oxide is shown below in Scheme 1. The formed, oxypropylated lignins are provided with various degrees of protection.

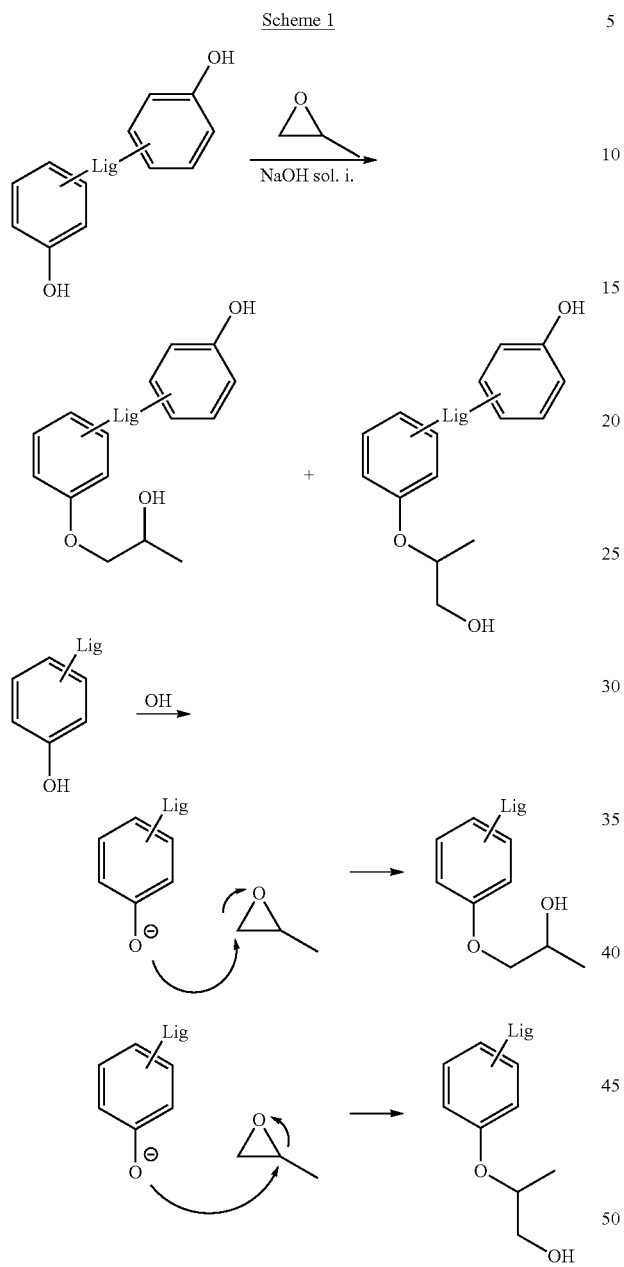

Quantitative $^{31}$P NMR spectra of partially oxypropylated lignin (a) and the starting, unprotected lignin (b) are shown in FIG. 2. As seen in FIG. 2, the significant peak between 130 to 145 ppm indicative of phenolic OH groups in spectrum (b) of the non-modified lignin is significantly lessened in spectrum (b), and a new signal at 145.8 ppm is indicative of the newly formed aliphatic OH groups on the oxypropyl-protected lignin. Quantitative integration of the spectra indicated that the amount of newly formed aliphatic OH in the protected lignin accounted for the depleted phenolic OH in the protected lignin compared to the non-protected lignin. Thus, through accurate monitoring using such spectral data, the present disclosure allows for the formation of reactive modified lignins with a controllable degree of protection and a controllable degree of pendant reactive functionality to allow for further chemical modification, which can be particularly useful for integration of the reactive modified lignin into various polymer systems.

In further embodiments, the disclosure provides means for synthesizing lignin polymers useful as a functional component in a three dimensional network polymer. For example, reactive modified lignin protected with an alkynyl moiety (e.g., a propargyl moiety) can be particularly useful for addition to network polymers through covalent bonding. An exemplary reaction mechanism for forming a propargyl reactive modified lignin is shown below in Scheme 2.

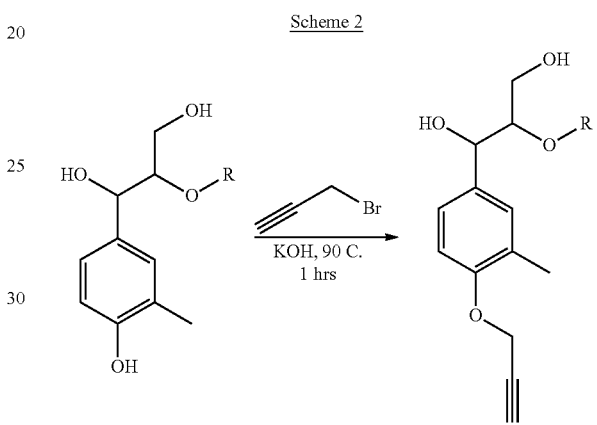

In exemplary embodiments, lignin that was reactive modified with a propargyl moiety was evaluated as a non-polar matrix for the creation of pendant unsaturated moieties, which can be useful for incorporation into advanced polymeric composite and transportation applications—e.g., tires. Such lignin derivatives can be readily used in a variety of industrial applications, can be implemented on a large scale, and can provide a desirably low price modification of polymer systems. In one embodiment, a propargyl reactive modified lignin (as well as further lignin derivatives) can undergo chain extension to provide even further types of lignin derivatives.

For example, as shown in Scheme 3, copper mediated oxidative coupling of propargyl reactive modified lignin can be used to form a biphenol structure with pendant unsaturated moieties. This can be particularly useful since thermosets that are produced from various biphenols have been shown to have a glass transition temperature above 300° C. with excellent isothermal thermo-stability in air and nitrogen. Such materials also may be useful in relation to their mechanical properties, low water absorption, low dielectric constants, and low dissipation factors. The pendant unsaturation present within the propargyl lignin derivatives may be subsequently used in covalently incorporating lignin (e.g., via vulcanization schemes in rubber) into a variety of existing and new 3D network polymer systems.

Scheme 3

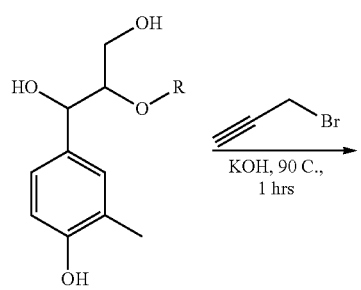

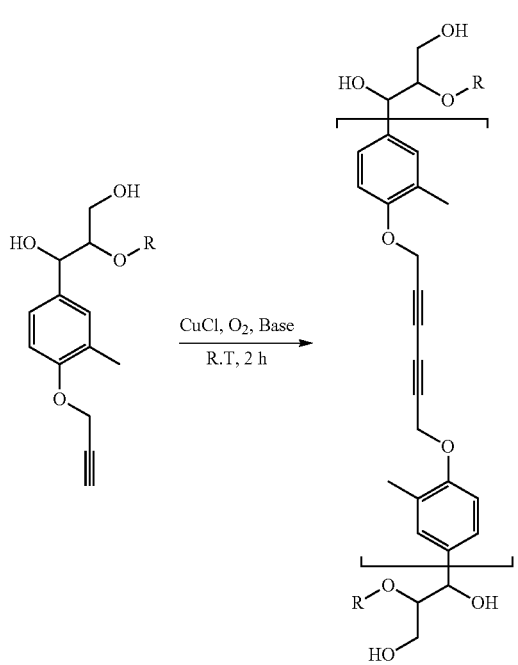

Reactive modified lignins can be characterized by an increased molecular weight in relation to technical lignin, which can make the lignin adapted for use in a variety of applications. For example, Table 1 shows the molecular weight of a starting Kraft (technical) lignin, a 65% propargylated Kraft lignin (e.g., prepared according to Scheme 2), and a 65% propargylated Kraft lignin that has been chain extended (e.g., according to Scheme 3). As seen therein, the propargyl reactive modified lignin exhibits an approximate 33% increase in MW over the technical lignin, and the chain extended reactive modified lignin exhibits and approximately 8.5 fold increase in MW compared to the technical lignin. This is further illustrated in the chromatogram shown in FIG. 3.

TABLE 1

| Sample | Molecular Weight (Da) |
| --- | --- |
| Starting Kraft Lignin | 2,000 |
| 65% Propargylated Kraft Lignin | 3,000 |
| Chain Extended, 65% Propargylated Kraft Lignin | 17,000 |

The ability according to the present disclosure to provide for coupling via the pendant alkylene groups is illustrated by the infrared data provided in FIG. 12. The characteristic vibrating modes related to the protons on the C—C triple bonds are seen to be reduced as the degree of coupling intensifies. In addition, a peak characteristic of the alkylene proton introduced in the lignin as a result of the propargylation is evident at 4.7 ppm in the proton NMR spectra of the propargylated lignin materials (proton NMR spectra not illustrated herein).

The reactive modified (via propargylation) and further coupled lignin also can show isothermal thermal stability. This was found to arise from the introduction of additional C—C bonds through coupling of the pendant propargyl groups, thus creating stable crosslinks in the material. This is seen in Table 2, which provides thermogravimetric weight loss data for a starting Kraft lignin, two lignin derivatives propargylated at different levels, and a copper mediated chain extended fully propargylated lignin. Compared to the starting lignin, the 2% and 5% weight loss for each of the derivatives and the fully chain extended product are significantly augmented. This is further illustrated in FIG. 4. Changes in glass transition temperature in relation to the extended lignin as derivatized is illustrated in FIG. 5 (i.e., in relation to propargyl reactive modified lignin).

TABLE 2

| Sample | 2% Weight Loss | 5% Weight Loss |
| --- | --- | --- |
| Starting Kraft Lignin | 162° C. | 225° C. |
| 14% Propargylated Kraft Lignin | 160° C. | 230° C. |
| 75% Propargylated Kraft Lignin | 188° C. | 270° C. |
| Fully Propargylated Kraft Lignin, Chain Extended | 218° C. | 315° C. |

In further embodiments, reactive modified lignin (including chain extended lignins) can be useful as a component in linear long-chain high performance and heat stable polymer and copolymer systems, polymer blends, and composite materials. The disclosure thus improves the ability to utilize the inherent branched nature of lignin in modulating the thermal transitions (i.e., polymer properties that depend on the available free volume of the system) of lignin and its copolymers, blends, and composites. Partially protected lignin ethers (e.g., lignins modified at the OH functional group) can be reacted with activated diphenols as shown in Scheme 4. Such reaction schemes can be useful in the synthesis of melt and heat stable aromatic polyethers. Appropriate selection of the leaving groups (X and Y in Scheme 4) present on the activated diphenol allows for customizable reactions with adjustable kinetics and polymer chain lengths.

Scheme 4

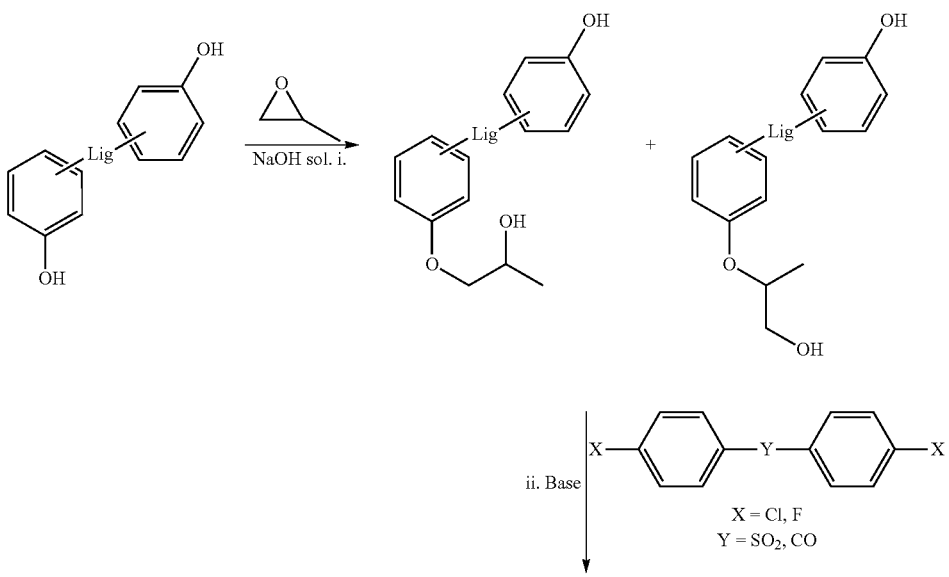

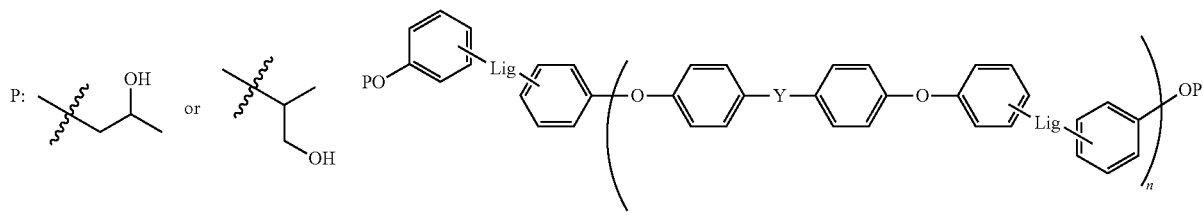

Additional examples of reactions useful in the preparation of linear polymer systems with beneficial properties are shown in Scheme 5 and Scheme 6. The reaction of bis(4-chlorophenyl) sulfone (Di-CPS) with oxypropylated and/or methylated lignin (R) shown in Scheme 5 proceeded smoothly when carried out in DMSO. Referring to Scheme 6, the reaction of partially oxypropylated and/or methylated lignins with 4,4'-difluorobenzophenone (Di-FBP) was found to be significantly more facile than the analogous reaction depicted in Scheme 5 using the diphenyl sulfone. These copolymers were also found to be of higher molecular weight, as shown below in Table 3 showing the weight average molecular weights for the starting Kraft lignin, the partially oxypropylated derivative, and the respective chain extended products created with the two sets of activated biphenols. Changes in glass transition temperature in relation to the chain extended lignins are illustrated in FIG. 6, wherein chain extension was by copolymerization with difluorodiphenyl sulfone (DFDPS).

Scheme 5

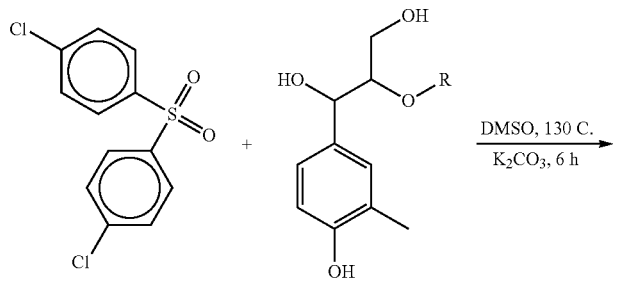

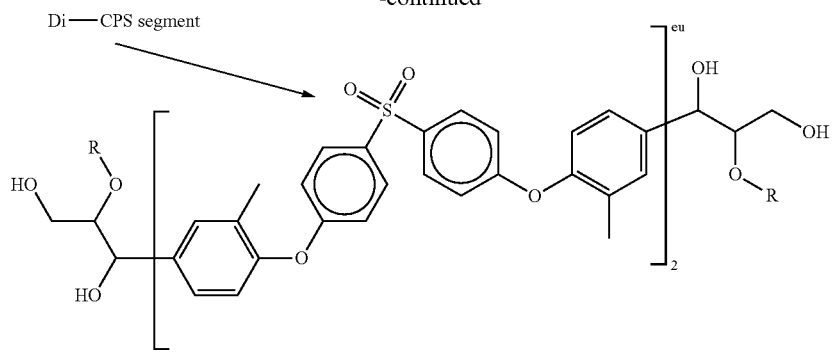

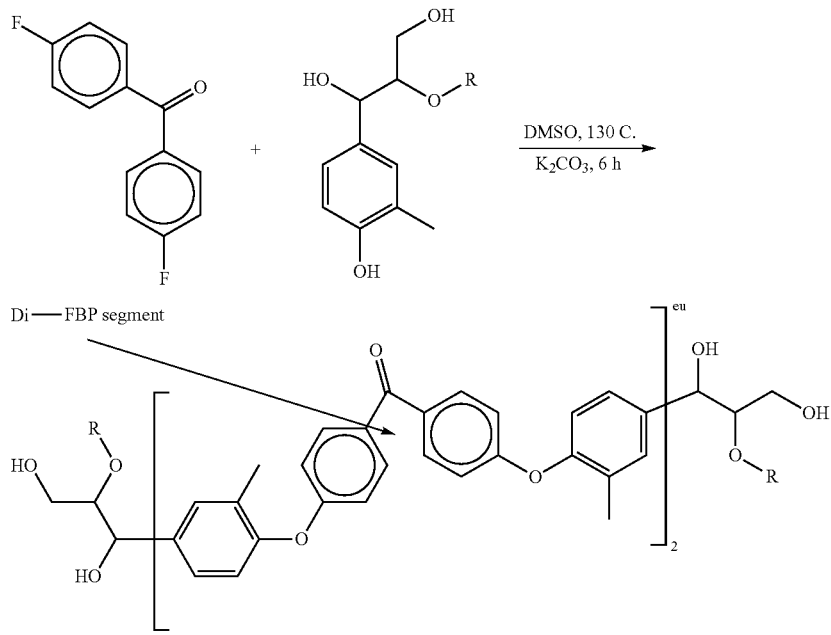

The presently disclosed subject matter is beneficial in the provision of a variety of comonomers. As non-limiting examples thereof, difluoro-diphenyl sulfone (DFDPS), dichlorinated biphenyls, and a variety of halogenated benzophenones (all with various degrees of substitution) can be provided. In certain embodiments, the incorporation of stiff biphenyl containing co-segments of variable substitution can be useful in providing stiff and aligned melts of significant value in carrying out carbonization for forming lignin based carbon fibers. In particular embodiments, lignin-containing polyethers particularly can be formed according to the present disclosure, and such polyethers can be particularly useful as carbon fiber precursors. This is because the copolymerization of Kraft lignin and/or its fractions with stiff co-monomers containing biphenyl or other moieties as well as activating groups (i.e., propargyl groups) offers significant advantages at a molecular level when lignin melts prior to carbonization are created. For example, upon melting and subsequent melt-drawing, the stiff co-monomers present in the fractionated or not fractionated lignin allows for the onset of alignment and a relatively regular placement of the activating groups within proximal molecular distances. Subsequently, under conditions of carbonization, the pendant activating groups that are held in place (and prevented from rotating with respect to each other) by the rigid biphenyl groups or other groups will react regularly creating the sought C—C linkages. Such regular events and linkages are intimately connected with the unique properties of carbon fibers. This approach offers, therefore, a degree of control for the creation of such materials from a lignin material that is otherwise intractable and difficult to work with (particularly for such applications). Materials provided by the present disclosure can be carbonized using any known methods.

TABLE 3

| Sample | Kraft Lignin | Protected Lignin | Protected and Extended Di CPS | Protected and Extended Di FBP |
|---|---|---|---|---|
| Molecular Weight (Da) | 2,000 | 2,500 | 14,000 | 16,000 |

The present disclosure still further provides various solvent fractionation processes that can be used with technical lignin to provided lignin fractions of variable molecular weight and functionality. More specifically, the fractionation processes can utilize a variety of ketones and various alcohols to allow for lignin fractions of variable functionality, branching, and molecular weight to be produced. These fractions, when subjected to the protection protocols otherwise discussed herein, provide further means for controlling and creating linear, branched, and network polymer and copolymer compositions, including through use of the chemistries already described herein. Exemplary means for using solvent fractionation to separate lignins of variable molecular weight are shown in Example 8.

EXPERIMENTAL

The present disclosure will now be described with specific reference to experimental work carried out to evaluate methods of preparing modified lignin and the modified lignin and other materials that were prepared. The experimental disclosure is not intended to be limiting of the disclosure and is rather provided as exemplary embodiments.

Example 1

Oxypropylation of Kraft Lignin

Kraft lignin (2 g, containing 3.86 mmol/g of total phenolic-OH) was dissolved in 25 ml of 0.4M KOH solution. Propylene oxide (1.9 mmol) was added into the lignin solution. The mixture was heated at 40° C. for 12 hours with stirring. The reaction was stopped and the lignin was precipitated by adding dilute hydrochloric acid. The precipitated lignin was washed with excess water and dried in a vacuum oven. The degree of oxypropylation was measured by phosphorus NMR.

Example 2

Propargylation of Derivatized and Non-Derivatized Kraft Lignin (65% Masking of Phenolic OH)

Selected Kraft lignins derivatized to different degrees (depending upon the particular application) and/or non-derivatized lignin (300 mg) prepared as described in Examples 1, 5, or 6 was dissolved in 10 ml of water containing KOH (1 mmol) with an initial pH of 13.7. Propargylbromide (0.4 mmol) was added into the lignin solution at room temperature. The mixture was heated to 90° C. and kept at this temperature of 1 hour with stirring (final pH=9.8). The final product was precipitated using dilute HCl and washed with excess water.

Example 3

Copper Mediated Oxidative Coupling of Propargylated Lignin

Propargylated lignin (150 mg) prepared as described in Example 2 was dissolved in 6 ml of dry pyridine. Copper chloride (15 mg) was dissolved in 2 ml pyridine and stirred with bubbling air to induce oxidation. Copper chloride solution in pyridine was then added to the lignin solution and stirred at room temperature for 30 minutes. The final solution was poured into 30 ml MeOH, and the precipitated lignin was separated and washed five times with MeOH and once with deionized water.

Example 4

Co-Polymerization of Partially Oxypropylated Lignin with Bis(4-chlorophenyl) Sulfone or 4,4'-Difluorobenzophenone Oxypropylated lignin (300 mg, 35% masking of phenolic OH) was dissolved in 10 ml of dry DMSO. Potassium carbonate (0.8 mmol) was added, and the mixture was heated at 100° C. for one hour. The respective dihalide (0.4 mmol) was then dissolved in 1 ml DMSO and added to the lignin solution of a period of 1 hour at a temperature of 130° C. The mixture was maintained at 130° C. for six hours. The final product was recovered by acidification, washing with water, and centrifugation. The product was then dried in a vacuum oven.

Example 5

Methylation and Oxypropylation of Kraft Lignin

A sample of commercially available Kraft lignin (indulin) was used as a starting material. Methylation of lignin (as shown below) was carried out by mixing with dimethyl sulfate (DMS) at 80° C. for two hours in NaOH alkali solution (10 mL/g). The amounts of reagents used are shown in Table 4. During methylation, sodium hydroxide was added to maintain a constant pH >12. Thereafter, the reaction mixture was acidified (pH 2.5) with 2N HCL, and the solid precipitate was washed with water and freeze dried.

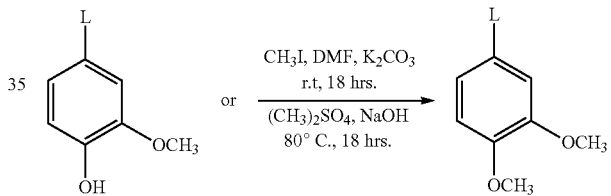

Oxypropylation of Kraft lignin (as shown below) was carried out by reaction of lignin with propylene oxide in 0.5M NaOH solution (10 ml/g) at 40° C. for 18 hours. Thereafter, the mixture was acidified (pH=2.5) with 2N HCl, filtered, and solid precipitate was washed with water and freeze dried.

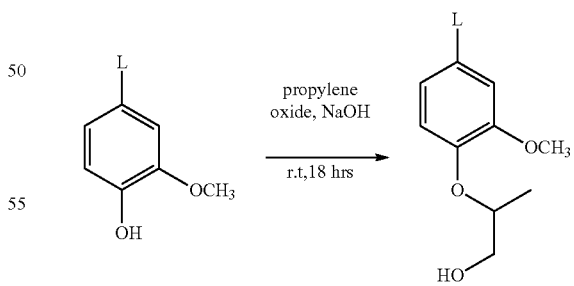

Example 6

Derivatization of Kraft Lignin with Dimethyl Carbonate (DMC)

Kraft Lignin (200 mg) was dissolved in 6 mL of dimethylsulfoxide at room temperature. An excess of dimethyl carbonate (4 mL, 45 mmol) together with 430 μL (2.9 mmol) of 1,8-diazobicyclo undec-7-ene (DBU) was heated at variable temperatures and times (e.g., 100° C. to 180° C. and 1 to 5 hours) using a Parr reactor lined with a glass liner. The reaction proceeded as shown below.

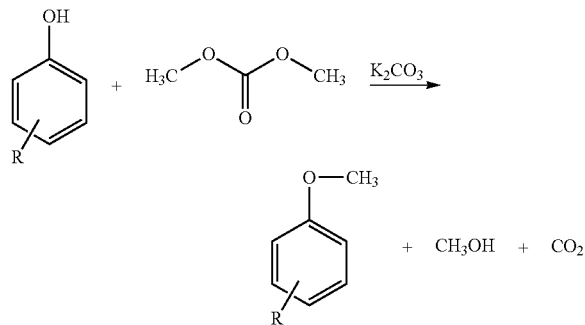

The final product was isolated by: acidification of the mixture to a pH of about 2.0 using 2N HCl; precipitation and washing with deionized water; and drying in a freeze dryer. In further tests, variable amounts of K2CO2 also was added to the dimethyl carbonate and DBU mixture.

Example 7

Solution and Melt Blending of Kraft Lignin Derivatives and Co-Polymers

Kraft lignin derivatives and/or copolymers were dissolved in DMF giving a polymer solution of about 10-20% w/v concentration depending upon the desired viscosity. The solution was then coated on a clean glass plate, and the solvent was removed by evaporation. The Kraft lignin derivatives were blended with various synthetic polymers including polyolefins and aromatic polysulfones using a DSM Explore twin screw conical minicompounder at appropriate temperatures and times as dictated by the $T_g$ of the component polymers.

Example 8

Fractionation of Lignin

Kraft lignin (indulin) (10 g) was dissolved in 150 mL of acetone and was stirred at room temperature for 4 hours. The residue was then filtered, and the dissolved fraction was separated from the un-dissolved fraction. After solvent evaporation the two fractions were further dried in a vacuum oven. The fraction including acetone soluble Kraft lignin (ASKL) was determined to be 35% by weight of the original material and of distinctly different hydroxyl group and molecular weight distribution as determined by quantitative $^{31}$P NMR and gel permeation chromatography respectively. The weight average molecular weight of the acetone soluble fraction was found to be about 1200 g/mol, while that of the precipitated (undissolved) fraction was about 20,000 g/mol. Addition of hexanes into acetone solutions of ASKL provided even cleaner and narrower fractions of Kraft lignin. FIG. 7 shows a series of thermogravimetric analytical data for the ASKL, its control counterpart (ASKL treated with NaOH in DMSO at 160° C. for 10 hours), and the copolymer of ASKL with difluorodiphenyl sulfone (DFDPS). The remarkable thermal stability of the copolymer is obvious where only about 4% of its weight was lost after exposure at 350° C. while the starting Kraft lignin lost about 32% of its weight at the same temperature.

Example 9

Characterization of Reactive Modified Lignin

The present disclosure can utilize specific means to rapidly arrive at a quantitative estimate of the reactive functional groups in lignin prior to and after protection, chain extension, and/or other modification. Specifically, the present disclosure encompasses quantitative $^{31}$P NMR equipment and methods of use thereof for quantifying the reactive functional groups in a lignin sample.

Quantitative $^{31}$P NMR of all lignin samples was obtained using published procedures. See Granata et al., *J. Agric. Food. Chem.* 1995, 43, 1538-1544; Corradini et al., Lignin-poly (vinyl alcohol) blends studied by thermal analysis, *Polymer Degradation and Stability* 66 (1999) 199-208; and Akim et al., *Holzforschung* 2001, 55, 386-390; the disclosures of which are incorporated herein by reference in their entireties. Dried lignin (40 mg) was dissolved in 500 μL of anhydrous pyridine and CDCL$_3$ mixture (1.6:1, v/v). 200 μL of endo-N-hydroxy-5-norbornene-2,3-dicarboximide (e-NHI) solution (9.23 mg/mL in pyridine and CDCL$_3$ (1.6:1, v/v) as the internal standard and 50 μL of chromium(III) acetylacetonate solution (5.6 mg/mL in the pyridine and CDCL$_3$ solution) as a relaxation reagent was added. Then, 100 μL of phosphitylating reagent II (2-chloro-4,4,5,5-tetramethyl-1,3,2-dioxaphospholane, TMDP) was added and transferred into a 5 mm NMR tube for subsequent NMR acquisition. NMR spectra were acquired using on a Bruker 300 MHz spectrometer equipped with a Quad probe dedicated to $^{31}$P, $^{13}$C, $^{19}$F, and $^{1}$H acquisition.

Fourier transforms infrared (FT-IR) spectra were obtained for powdered solid lignin on KBr discs using a Bruker Tensor Series FT-IR Spectrometer. The Spectra was collected from 4000 to 400 cm-1 with 64 scans and 4 cm-1 resolution.

Gel Permeation Chromatography measurements were carried out with Waters pumps equipped with UV and RI detectors using THF as the eluant at a flow rate of 0.6 mL/min. at 35° C. Two Ultrastyragel linear columns linked in series (Styragel HR 1 and Styragel HR 5E) were used for the measurements. Standard monodisperse polystyrenes were used for the calibration. Acetylated samples were used for all experiments.

The glass transition temperatures (Tg) of all samples were determined by differential scanning calorimetry (DSC) with a TA Q100 instrument under nitrogen (flow rate 50 ml/min) using sealed aluminum crucibles. An appropriate amount of sample (around 8 mg) was put into a pre-weighed pan. The pans were closed by cold-pressing. The samples were heated up to 120° C. (5° C./min), kept here for 30 min, and then quenched to 40° C. Finally, the samples were heated to 200° C. with a heating rate of 10° C./min. The glass transition temperatures were determined from the midpoint of the heat flow shift.

After carrying out masking of lignin phenolic OH via oxypropylation and methylation as discussed above, the effect of these derivatizations on the thermal stability and glass transition point of the lignin was examined. Kraft lignin (Indulin) was used for this study as it is one of the most available lignin materials industrially. Samples were characterized by employing different methods. $^{31}$P NMR spectroscopy was employed for quantitative determination of hydroxyl groups. Amounts of total phenolic and aliphatic hydroxyl groups in the starting material were determined to be 3.85 mmol/g and 2.4 mmol/g respectively, as shown in FIG. 8. The molecular weight (Mw) was calculated to be about 8000 g/mol by GPC, and the glass transition point (Tg) of the lignin was determined to be 155° C. by DSC.

Kraft lignin was chemically modified directly to methylated and oxypropylated derivatives according to the methods described above. Three methods for lignin methylation were used: i) methylation with methyl iodide was carried out in organic solvent (DMF) in the presence of $K_2CO_3$ at room temperature; ii) methylation with dimethyl sulfate was carried out in NaOH solution at 85° C.; iii) and methylation using dimethyl carbonate as described in Example 6. A summary of the methylation and oxypropylation reaction conditions and results is shown in Table 4, which shows that the values of different hydroxyl groups before and after modifications.

TABLE 4

| Conversion methods | R/L* | Total hydroxyl groups in the samples mmol/g Lignin | | |
|---|---|---|---|---|
| | | Phenolic-OH | Aliphatic-OH | New aliphatic-OH |
| Kraft lignin | 00 | 3.85 | 2.4 | |
| Methylation with $(CH_3)_2SO_4$ | 1 | 2.2 | 2.34 | |
| | 1.5 | 0.91 | 2.33 | |
| | 2 | 0.5 | 2.3 | |
| | 2.5 | 0.03 | 2.34 | |
| Oxypropylation | 0.5 | 3.35 | 2.35 | 0.46 |
| | 1 | 1.92 | 2.38 | 1.86 |
| | 2 | 0.41 | 2.38 | 3.33 |
| | 3 | 0.05 | 2.36 | 3.79 |

*Molar ration of reagents to phenolic-OH in the lignin

Methylation with DMS

For methylation with DMS, four series of samples were synthesized with 1, 1.5, 2 and 2.5 molar ratio of dimethyl sulfate to phenolic-OH (R/L) of lignin. $^{31}P$ NMR spectra of the methylated Kraft lignins are presented in FIG. 9 and the data are shown above in Table 4. The comparison of the $^{31}P$ NMR spectra shows that phenolic hydroxyl groups in lignin were reacted with dimethyl sulfate and converted to their corresponding methylated groups. The phenolic hydroxyl group content decreased, but the aliphatic-OH was stable in this reaction. Also the result shows that using of 2.5 mmol dimethyl sulfate per each mmol of phenolic-OH in the lignin can convert very close to 100% of the phenolic OH to the corresponding methylated groups. The $^{31}P$ NMR spectra of methylated Kraft lignin with dimethyl sulfate shows that the carboxylic acids did not completely undergo transformation to their corresponding methylated groups.

Oxypropylation with Propylene Oxide and Propargylation with Propargyl Bromide

For oxypropylation, four series of samples were synthesized with different mmol propylene oxide per mmol phenolic-OH in the lignin (PO/L ratios). Ratios of 0.5, 1, 2, and 3 were used. Evidence of oxypropylation was checked by $^{31}P$ NMR and with FTIR. As shown in FIG. 10, two different and distinct broad signals in the aliphatic region of the $^{31}P$ NMR spectra were recorded between 144.1 to 146.5 ppm, and 146.7-149.5 ppm, respectively. Closer examination of the spectra confirms that the NMR signal recorded between 146.7 to 149.5 ppm is attributed to the similar aliphatic-OH groups that were present in the original lignin sample, and the signal in the range of 146.7-149.5 ppm is created by the new aliphatic-OH of oxypropylation. As shown in FIG. 10 and Table 4, the increasing amount of new aliphatic-OH corresponds to a decrease in phenolic OH in the lignin. Table 4 also shows the evolution of the lignin oxypropylation as a function of mmol reagent per each mmol of phenolic OH in the lignin (R/L ratios). Inspection of the aliphatic-OH and phenolic-OH evolution reveals that oxypropylation of the samples increased with increasing propylene oxide content in the presence of adequate catalyst. Use of 3 mmol propylene oxide per each mmol of phenolic OH in the lignin converted almost all phenolic OH to corresponding, new alkyl groups. As seen in FIG. 11, an increase in the bands at 2971-2870 $cm^{-1}$ of the FTIR spectra was attributed to the stretching of $CH_3$, $CH_2$, and CH aliphatic groups and an increase in absorption in the C—O stretching region (1000-1100 cm-1) associated with the ether moieties. This indicated the occurrence of propylene oxide grafting on the lignin.

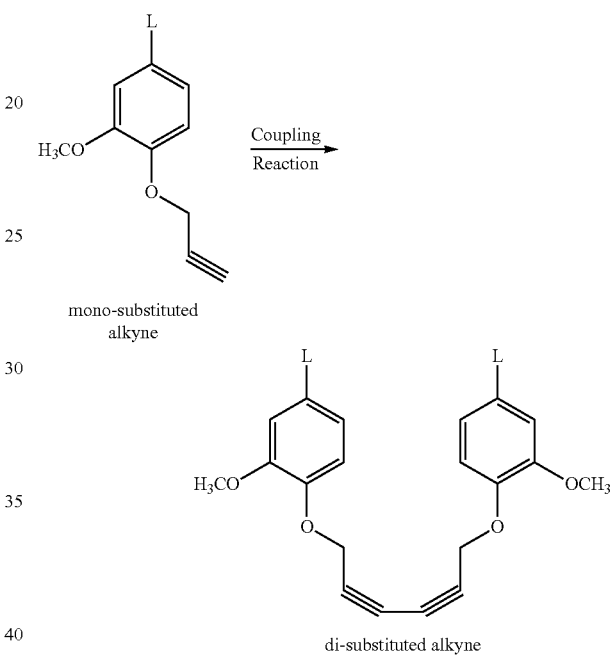

mono-substituted alkyne di-substituted alkyne

Structural & Polymer Characterization of Thermally Treated Lignins & Derivatives According to thermal studies carried out, hydrogen bonds of lignin are ruptured at a temperature of about 60-80° C. Within this range, early stage primary condensation of the lignin begins involving hydroxyl groups and benzyl-alcohol groups of the propane chain. With increasing temperature, a competing reaction of disintegration of alkyl-aryl bonds begins and increases the content of phenolic hydroxyl. This process in lignin continues up to a temperature of about 300° C. Thermal stability of lignin for polymer use is important. Thermal destruction of lignin structure occurs via a heterolytic mechanism. Phenolic hydroxyl groups play an important role on lignin thermal behavior especially on its condensation reactions.

Lignin has a heavily branched structure and is not suitable for preparation of linear polymers. Selective masking of phenolic-OH of the lignin, per the present disclosure, improves its solubility and thermal stability and can convert it to a valuable material for polymer applications. DSC is the most widely used method to measure the glass transition temperature of an amorphous polymer. See Hatakeyama et al., Thermal Properties of Green Polymers and Biocomposites, *Kluwer Academic Publishers*, 2004, pp 174; and Wada, Y., 1981, Physical properties of polymer in solid state, *Baifukan pub.*

Tokyo, the disclosures of which are incorporated herein by reference in their entireties. The prior art had shown that annealing lignin at a temperature of about 30° C. above Tg causes the Tg to merge with actual glass transition. See Hatakeyama et al., Thermal decomposition and glass transition of industrial hydrolysis lignin, *J Therm Anal calorim* (2010) 101:289-295; Hatakeyama et al., Thermal analysis of lignin by differential scanning calorimetry. *Cell Chem Technol.* 1972; 6:521-9; and Marshall et al., Physical aging of glassy polymers: effects of subsidiary relaxation processes. In: Eby R H, editor. Durability of macromoelcular materials. *ACS Symposium, Series* 95, Washington D.C., Am Chem Soc; 1979. p. 245-59; the disclosures of which are incorporated herein by reference in their entireties. The present research, however, indicated that heating above Tg created a significant change in the lignin structure and its molecular weight, and it cannot be a representative of the starting materials. In this work, lignin was heated to 120° C. at a rate of 5° C./min and isolated for 30 min. The sample was quenched to 30° C. and, after a 5 minute isotherm, the samples were heated at a rate of 10° C./min to 250° C. The middle point of heat flow shift was used for Tg determination. The glass transition temperatures (Tg) were determined from the second heating scan. The Tg of Kraft lignin was determined to be around 155° C., whereas Tg for fully methylated and oxypropylated lignin were found to be around 127° C. The reason for these lower Tg values is believed to arise from the lowering and breaking of intermolecular hydrogen bound in lignin due to the replacement of phenolic hydroxyl groups and expansion of intermolecular distance. With an increase in methylation, Tg decreased (See FIG. 13). Methylation of 25% of the lignin phenolic hydroxyl decreased Tg about 10° C. In the fully methylated lignin, the decrease in Tg was about 27° C.

Molecular weight of Kraft lignin, fully methylated lignin, and fully oxypropylated lignin were determined by gel permeation chromatography (GPC). The results show that the weight average molecular weight (Mw) and the number average molecular weight number (Mn) for Kraft lignin were 8,000 and 2,000 g/mol respectively. The values for fully methylated lignin and fully oxypropylated lignin were essentially identical.

Thermal stability of Kraft lignin and its modified derivatives were examined and compared after heating in $N_2$ atmosphere at 20° C. above their respective Tg. Effects of derivatization on the thermal behavior are shown in FIG. 14. The data showed that fully methylated lignin was completely stable during heating of the sample at 20° C. above its Tg. On the other hand, the molecular weight of Kraft lignin and fully oxypropylated lignin each increased with heating. Kraft lignin was very sensitive to heating and, after only 20 minutes of heating above Tg, its molecular weight increased from 8,000 to $5 \times 10^4$ g/mol. Heating more than 20 minutes made the Kraft lignin insoluble in usual lignin solvents. Oxypropylated lignin was also sensitive to heating, but its thermal stability was better than the initial Kraft lignin.

The GPC curve of unheated and heated fully methylated lignins is shown in FIG. 15. The molecular weight distribution patterns of thermally treated samples that were heated and cooled over a period of up to three hours at a temperature of about 20° C. above the material's Tg (150° C.) were similar to that of the unheated methylated lignin. This illustrated that methylation of the lignin can convert it to a thermally stable form. This is believed to occur, at least in part, because of the removal of phenolic OH in the lignin. Minute changes in the MW distributions are indicative of the sought chemically stable melt characteristics.

Similarly, FIG. 16 shows the GPC curve of unheated and heated, fully oxypropylated lignins. The molecular weight of the samples increased with heating. With an increase in time of heating, the molecular weight showed a greater gain than with the methylated lignin. This illustrated less thermal stability of the oxypropylated lignin compared with the methylated lignin.

The thermal stability of Kraft lignin, fully methylated lignin, and fully propylated were compared, and the results are shown in FIG. 17. As seen therein, the molecular weight of unmodified Kraft lignin and oxypropylated lignin increased with heating.

Propargylation

FTIR data can be useful for further characterization of propargylated and coupled Kraft lignin. For example, an IR peak between 3660 $cm^{-1}$ to 2900 $cm^{-1}$ (intermolecular hydrogen bonded —OH) is seen to be reduced after propargylation. A new, sharp peak is formed at 3270 $cm^{-1}$ upon propargylation and corresponds to C—H stretching of the alkyne group. A new, sharp peak also is apparent at 2120 $cm^{-1}$ upon propargylation, and this corresponds to the mono-substituted carbon-carbon triple bond stretching of the alkyne group. Further, a new peak is apparent at 2230 $cm^{-1}$ after the coupling reaction, and this corresponds to di-substituted carbon-carbon triple bond stretching of the alkyne group. An exemplary coupling reaction is shown below. Spectral data of various coupling reactions based on reaction time is shown in FIG. 12 in comparison to 100% propargylated ASKL and ASKL alone.

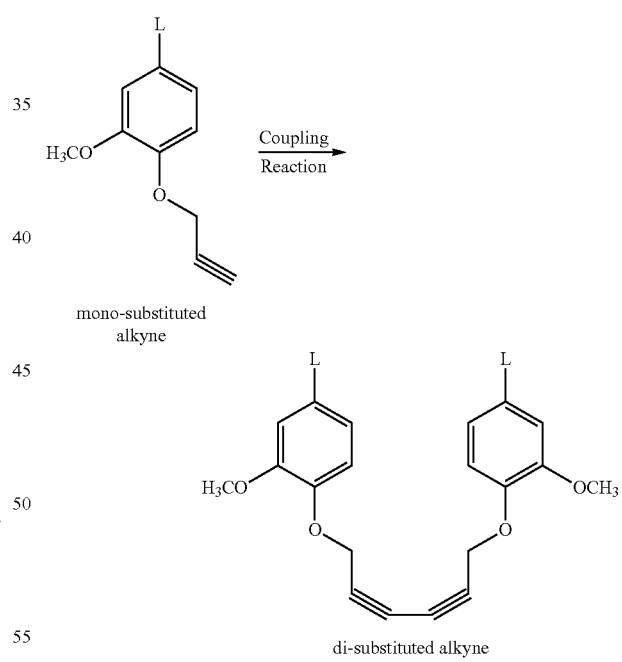

The introduction of variable amounts of propargyl groups in Kraft lignin provided a modulated and controlled means to create thermal crosslinking in lignin that is useful in the carbonization step used in the formation of carbon fibers from lignin. As seen in FIG. 18 and Table 5, the molecular weight of the lignin gradually increases with increasing temperature and time of heating. The effect of the activating propargyl group toward thermally increasing the molecular weight in a controlled fashion is apparent. The data shown in FIG. 18 is particularly significant in that the thermal treatment of propargylated lignin does not result in long, high molecular weight tailing in gel permeating chromatography (GPC), which can be indicative of branching. Rather, the peak maximum moves to lower elution volumes in the GPC.

TABLE 5

| Sample | Mn (g/mol) | MW (g/mol) | Polydispersity Index (MW/Mn) |
|---|---|---|---|
| Propargylated Lignin 20%, Methylated 80% (starting material) | 930 | 1,400 | 1.5 |
| Propargylated Lignin 20%, Methylated 80%, Heated at 150° C. for 10 Minutes | 1,200 | 2,700 | 2.2 |
| Propargylated Lignin 20%, Methylated 80%, Heated at 150° C. for 60 Minutes | 1,400 | 4,300 | 3.0 |
| Propargylated Lignin 20%, Methylated 80%, Heated at 170° C for 10 Minutes | 1,100 | 5,000 | 3.6 |
| Propargylated Lignin 20%, Methylated 80%, Heated at 170° C. for 20 Minutes | 1,100 | 8,600 | 8.0 |

Many modifications and other embodiments of the disclosure set forth herein will come to mind to one skilled in the art to which this disclosure pertains having the benefit of the teachings presented in the foregoing descriptions. Therefore, it is to be understood that the disclosure is not to be limited to the specific embodiments described and that modifications and other embodiments are intended to be included within the scope of the appended claims. Although specific terms are employed herein, they are used in a generic and descriptive sense only and not for purposes of limitation.

The invention claimed is:

1. A reactive modified lignin comprising a lignin having about 5% or greater of the reactive functional groups thereon masked with a propargyl masking moiety.

2. The reactive modified lignin of claim 1, wherein the modified lignin exhibits a thermal stability defined by an increase of the molecular weight of the modified lignin of about 10% or less when the modified lignin is heated at a temperature of about 20° C. above its glass transition temperature (Tg).

3. The reactive modified lignin of claim 1, wherein the modified lignin exhibits thermal stability defined by a weight loss of the modified lignin that is less than 5% when heating to a temperature of greater than 225° C.

4. The reactive modified lignin of claim 1, wherein the modified lignin exhibits a glass transition temperature (Tg) that increases monotonically with the percentage of reactive functional groups that are masked with the masking moiety.

5. The reactive modified lignin of claim 1, wherein the reactive functional groups are selected from the group consisting of hydroxyl, methoxyl, carbonyl, and carboxyl, and combinations thereof.

6. A lignin polymer comprising a chain of reactive modified lignin according to claim 1.

7. The lignin polymer of claim 6 defined by a weight average molecular weight of about 5,000 Da or greater.

8. A polymer system comprising a reactive modified lignin according to claim 1.

9. The polymer system of claim 8, wherein the reactive modified lignin is covalently bonded within a three-dimensional network polymer.

10. The polymer system of claim 8, wherein the polymer system is a copolymer of the reactive modified lignin and a further monomer.

11. The polymer system of claim 8, wherein the polymer system is a linear polymer.

12. A carbon fiber comprising a carbon backbone that is substantially identical to the carbon backbone of the polymer system of claim 8.

13. A solution or melt blend comprising a polymer system according to claim 10.

14. A solution or melt blend comprising a polymer system according to claim 8.

15. A solution or melt blend comprising a reactive modified lignin according to claim 1.

16. A method of preparing a polymer system comprising reacting a reactive modified lignin according to claim 1 with a second material under conditions such that the modified lignin covalently bonds with the second material.

17. The method of claim 16, wherein the second material is a three-dimensional network polymer.

18. The method of claim 16, wherein the second material is a monomer.

19. The method of claim 16, wherein the second material is selected from the group consisting of optionally substituted alkyl, optionally substituted alkenyl, optionally substituted alkynyl, and combinations thereof.

20. The method of claim 16, wherein the resultant polymer system exhibits a controllably modulated thermal reactivity that is controlled by varying the amount of the second material utilized in the reaction relative to the lignin.

21. The method of claim 16, further comprising carbonizing the polymer system.

22. The method of claim 21, further comprising spinning the polymer system into one or more fibers prior to the carbonizing step.

23. A method of forming a reactive modified lignin comprising reacting a starting lignin with a propargyl masking moiety under conditions such that about 5% or greater of the reactive functional groups on the starting lignin react with the propargyl masking moiety and thereby become masked by the propargyl group.

24. The method of claim 23, further comprising polymerizing the reactive modified lignin.

25. The method of claim 24, wherein the polymerizing comprises copolymerizing the reactive modified lignin with a comonomer.

26. The method of claim 23, further comprising forming the reactive modified lignin into a solution or melt blend.

27. A method of preparing a lignin derivative of increased thermal stability comprising:
providing a technical lignin comprising soluble and insoluble lignin;
fractionating the technical lignin by at least partially dissolving the technical lignin in a suitable solvent and separating the thus dissolved technical lignin into a soluble lignin fraction and an insoluble lignin fraction; and
modifying the separated soluble lignin fraction by covalently incorporating a propargyl masking moiety into the structure thereof.

28. The method of claim 27, further comprising polymerizing the lignin derivative.

29. The method of claim 28, wherein the polymerizing comprises copolymerizing the lignin derivative with a comonomer.

30. The method of claim 27, further comprising forming the lignin derivative into a solution or melt blend.

31. The method of claim 27, wherein the suitable solvent is an organic solvent.

32. The method of claim 27, wherein the suitable solvent is a ketone or an alcohol.

33. A method of forming a carbon fiber comprising:
   polymerizing a reactive modified lignin comprising a lignin having about 5% or greater of the reactive functional groups thereon masked with a propargyl masking moiety that is less reactive than the functional group;
   spinning the polymerized reactive modified lignin into one or more fibers; and
   carbonizing the one or more fibers.

34. The method of claim 33, wherein the polymerizing comprises copolymerizing the reactive modified lignin with a comonomer.

35. A polymer system comprising a reactive modified lignin comprising a lignin having about 5% or greater of the reactive functional groups thereon masked with a masking moiety selected from the group consisting of an oxypropyl masking moiety, a propargyl masking moiety, and combinations thereof, wherein the polymer system is a copolymer of the reactive modified lignin and a further monomer that comprises one or both of a biphenyl and a benzophenone.

* * * * *